US012561847B2

(12) United States Patent
Lasserre

(10) Patent No.: US 12,561,847 B2
(45) Date of Patent: Feb. 24, 2026

(54) ENHANCED EDGE NEIGHBORHOOD FOR CODING VERTEX INFORMATION

(71) Applicant: Comcast Cable Communications, LLC, Philadelphia, PA (US)

(72) Inventor: Sébastien Lasserre, Thorigné-Fouillard (FR)

(73) Assignee: Comcast Cable Communications, LLC, Philadelphia, PA (US)

( * ) Notice: Subject to any disclaimer, the term of this patent is extended or adjusted under 35 U.S.C. 154(b) by 102 days.

(21) Appl. No.: 18/490,385

(22) Filed: Oct. 19, 2023

(65) Prior Publication Data

US 2024/0135597 A1    Apr. 25, 2024
US 2024/0233197 A9    Jul. 11, 2024

Related U.S. Application Data

(60) Provisional application No. 63/417,613, filed on Oct. 19, 2022.

(51) Int. Cl.
    *G06T 9/00*         (2006.01)
    *G06T 9/20*         (2006.01)

(52) U.S. Cl.
    CPC ..................................... *G06T 9/20* (2013.01)

(58) Field of Classification Search
None
See application file for complete search history.

(56) References Cited

U.S. PATENT DOCUMENTS

| | | | | |
|---|---|---|---|---|
| 10,192,353 B1* | 1/2019 | Chou | ....................... | G06T 17/00 |
| 2011/0267347 A1* | 11/2011 | Purcell | .................... | G06T 15/06 |
| | | | | 345/426 |

| | | | | |
|---|---|---|---|---|
| 2021/0004992 A1* | 1/2021 | Flynn | ....................... | G06T 17/10 |
| 2021/0192797 A1* | 6/2021 | Lasserre | .................... | G06T 9/40 |
| 2021/0233284 A1* | 7/2021 | Sugio | ......................... | G06T 9/40 |
| 2022/0210466 A1* | 6/2022 | Pham Van | ........... | H04N 19/124 |
| 2022/0319096 A1* | 10/2022 | Perry | ........................ | G06N 3/02 |
| 2022/0351423 A1* | 11/2022 | Martin-Cocher | .... | H04N 19/597 |
| 2022/0353549 A1* | 11/2022 | Lasserre | .............. | H04N 19/105 |
| 2022/0414940 A1* | 12/2022 | Yasuda | ..................... | G06T 9/40 |

(Continued)

FOREIGN PATENT DOCUMENTS

EP            3553745 A1    10/2019

OTHER PUBLICATIONS

S. Lasserre, "[GPCC] [TriSoup] Part 6 compression of vertex presence flag and vertex position," Apr. 24, 2022, Xiaomi, Motion Picture Expert Group.

(Continued)

*Primary Examiner* — Martin Mushambo

(74) *Attorney, Agent, or Firm* — Banner & Witcoff, Ltd.

(57)            ABSTRACT

One or more methods, apparatuses, computer-readable storage mediums, and systems for entropy coding vertex information of an edge in a voxelized space of a point cloud are disclosed. Symbols of a neighborhood configuration of a current edge may be determined based on one or more already coded edges. The already coded edges may be selected from a spatial topology of edges or its subset. A lookup table may be used to retrieve an index for a given occupancy configuration for a neighborhood of a current edge. The index may indicate an appropriate context or probability model. Based on the coding of the current edge, the lookup table may be updated.

42 Claims, 40 Drawing Sheets

Determine one or more symbols of a neighborhood configuration of a current edge based on vertex information of edges only belonging to a spatial topology of edges, where each edge of the spatial topology of edges is available for coding the current edge independent of a direction of the current edge
2002

Selecting a context for coding vertex information of the current edge based on the neighborhood configuration
2004

Entropy coding the vertex information of the current edge based on the context
2006

2000

(56)  References Cited

U.S. PATENT DOCUMENTS

| | | | |
|---|---|---|---|
| 2023/0018907 A1* | 1/2023 | Pham Van .............. | G06T 9/004 |
| 2023/0162414 A1* | 5/2023 | Shao ..................... | G06T 11/203 |
| | | | 345/628 |
| 2023/0177739 A1* | 6/2023 | Pham Van ............. | H04N 19/96 |
| | | | 382/233 |
| 2023/0196663 A1* | 6/2023 | Tian ........................ | G06T 9/001 |
| 2023/0419552 A1* | 12/2023 | Oh ........................ | H04N 19/124 |
| 2024/0251097 A1* | 7/2024 | Pham Van ........... | H04N 19/139 |

OTHER PUBLICATIONS

Jan. 17, 2024—International Search Report—App. No. PCT/US2023/035507.

* cited by examiner

Determine occupancy configuration β
*602*

Dynamically reduce using $DR^n$
*604*

Lookup context index in LUT
*606*

Select context
*608*

Entropy code occupancy of current child cuboid
*610*

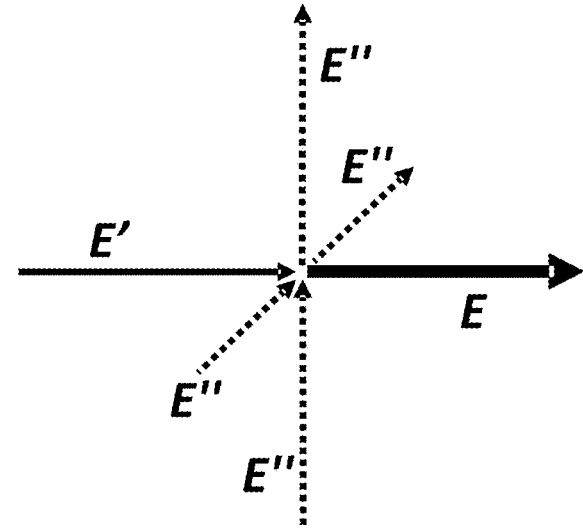
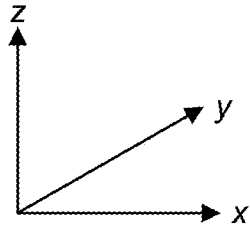
FIG. 11A

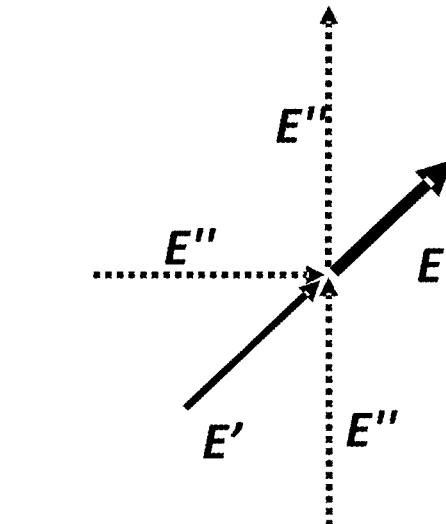
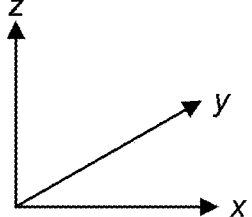
FIG. 11B

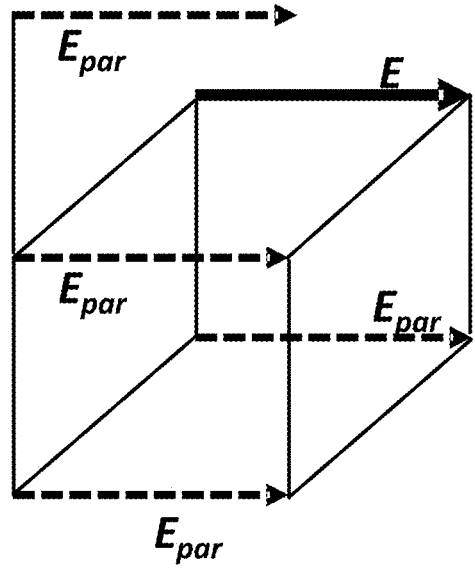
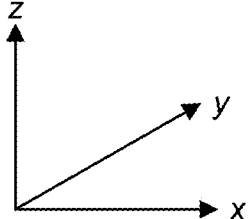
FIG. 12A

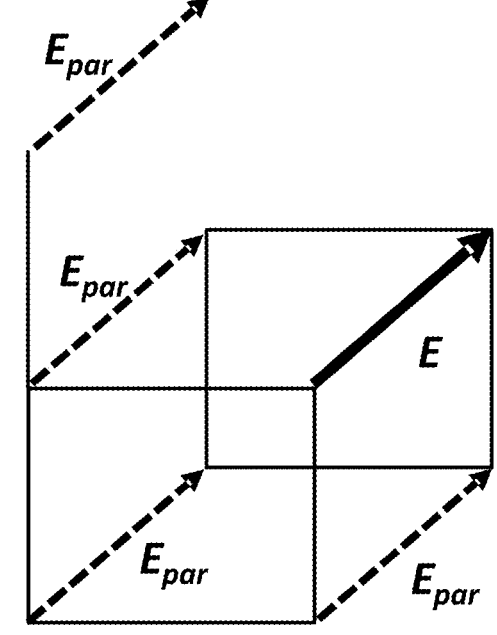
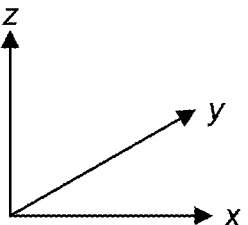
FIG. 12B

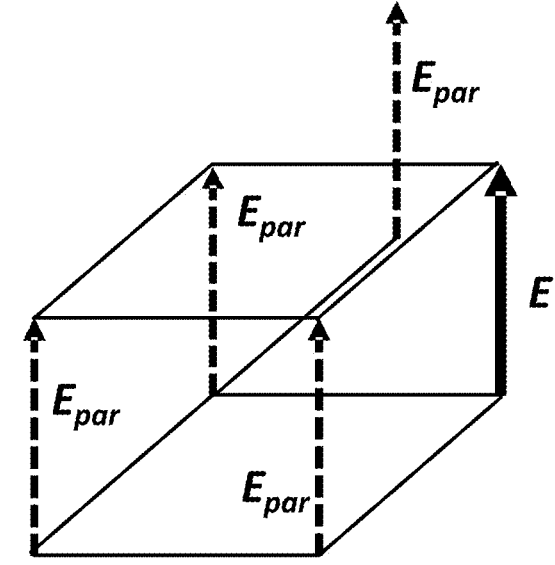
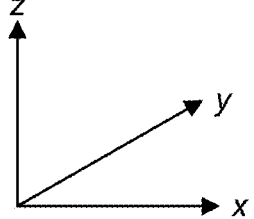
FIG. 12C

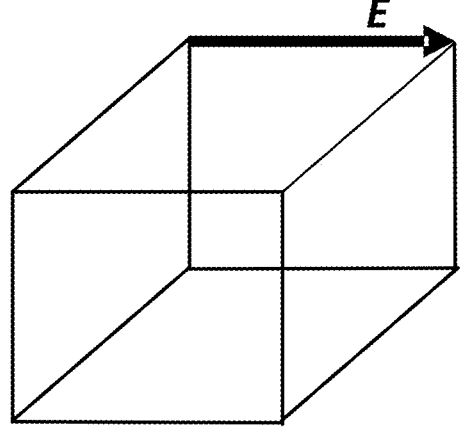
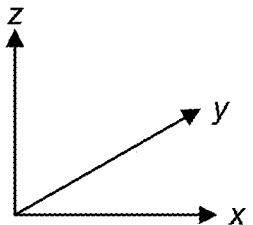
FIG. 13A

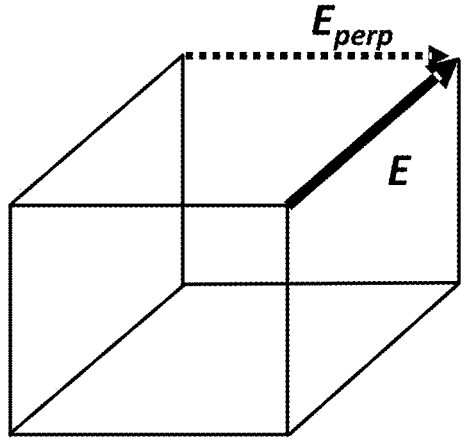
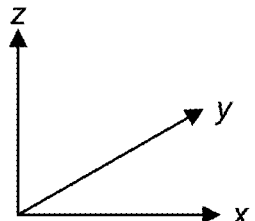
FIG. 13B

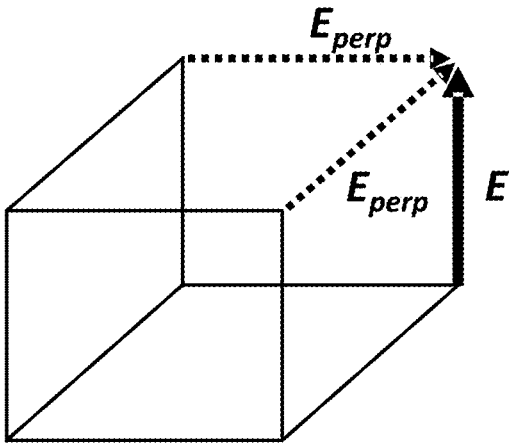
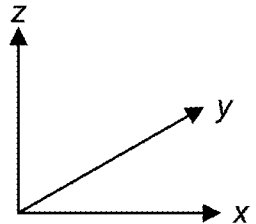
FIG. 13C

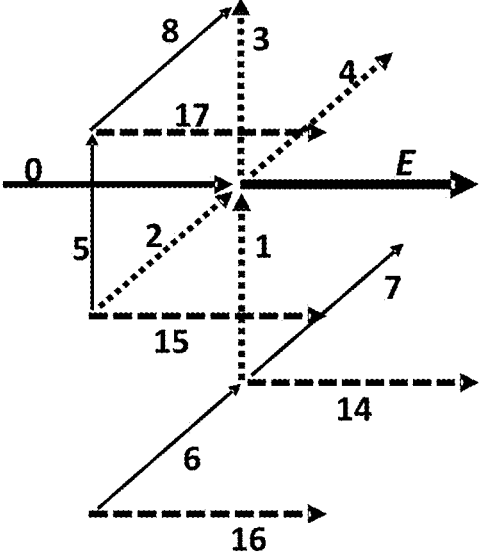
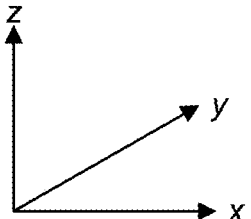
FIG. 14A

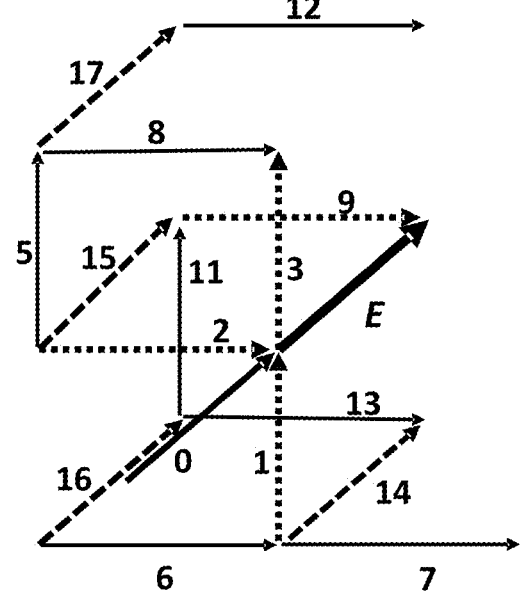
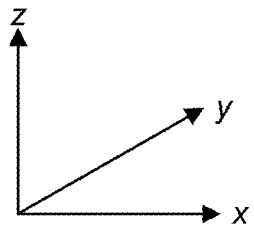
FIG. 14B

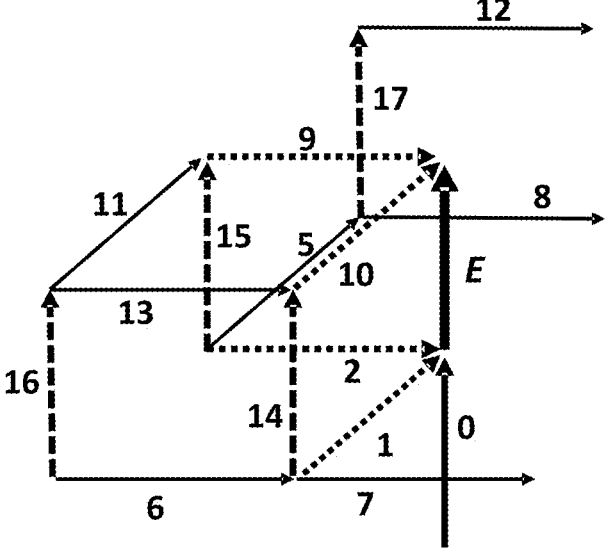
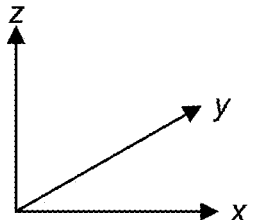
FIG. 14C

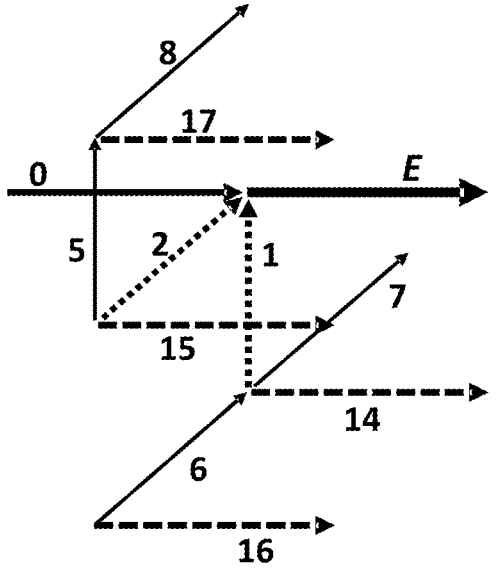
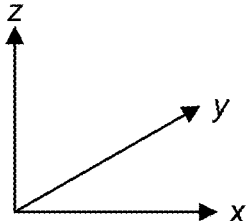
FIG. 15A

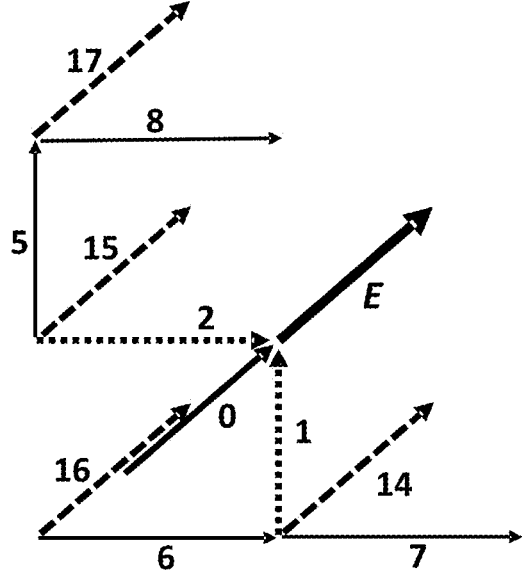
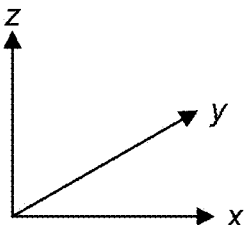
FIG. 15B

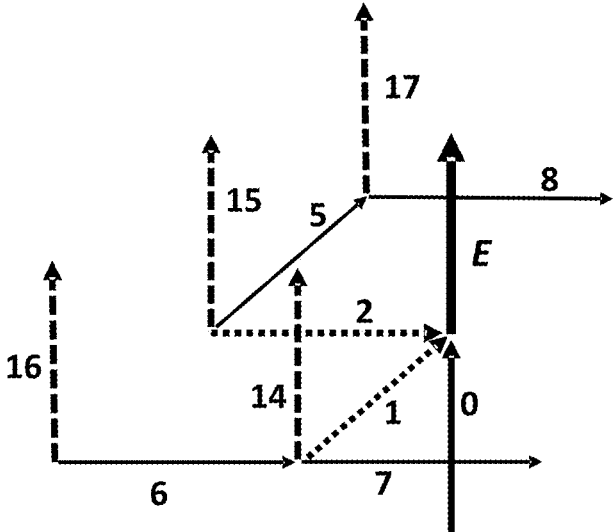
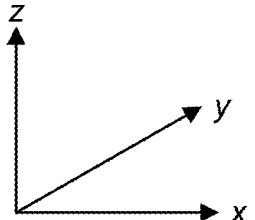
FIG. 15C

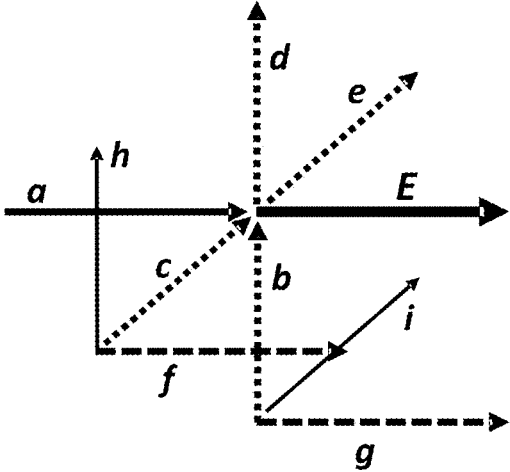
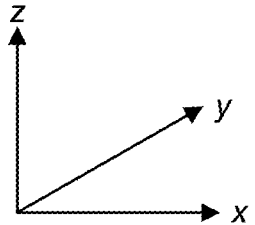
FIG. 16A

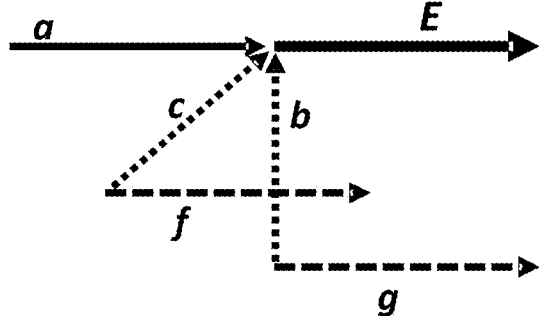
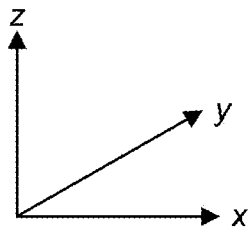
FIG. 17A

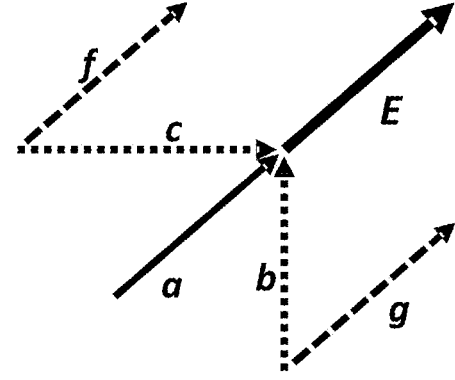
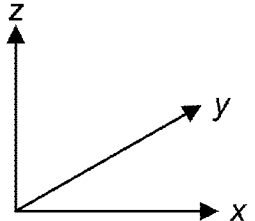
FIG. 17B

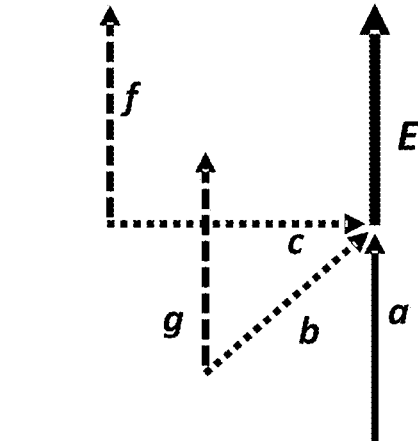
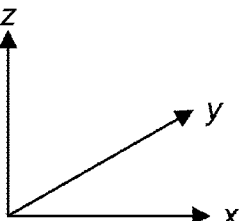
FIG. 17C

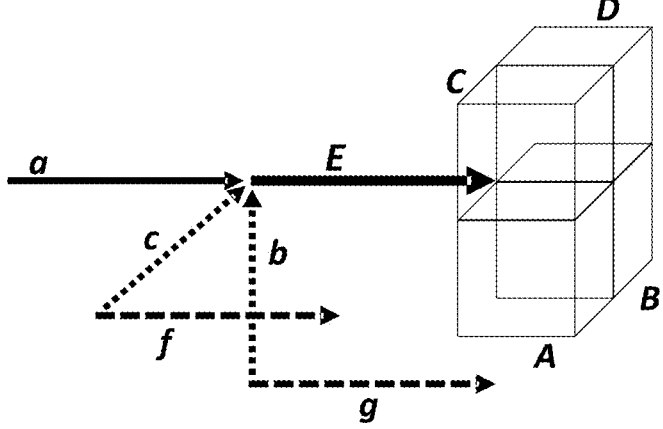
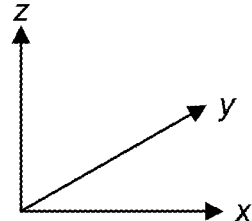
FIG. 18A

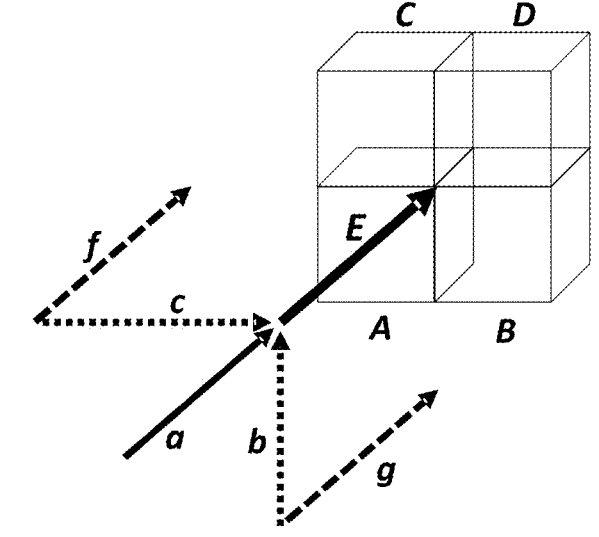
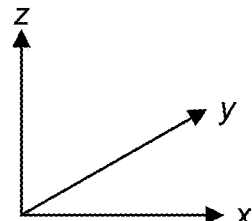
FIG. 18B

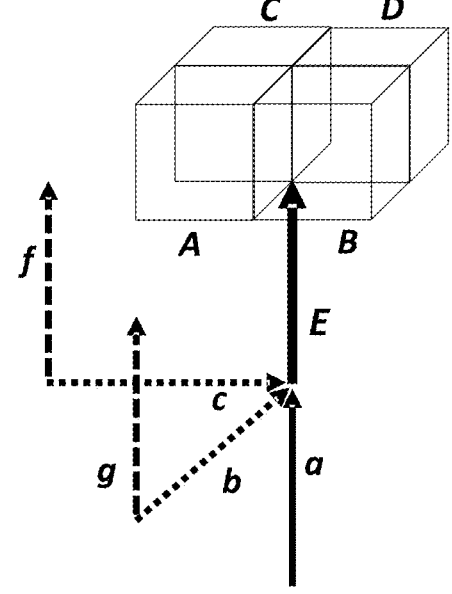
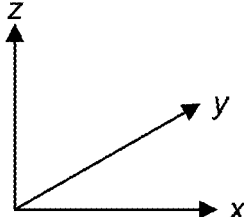
FIG. 18C

Figure 19:
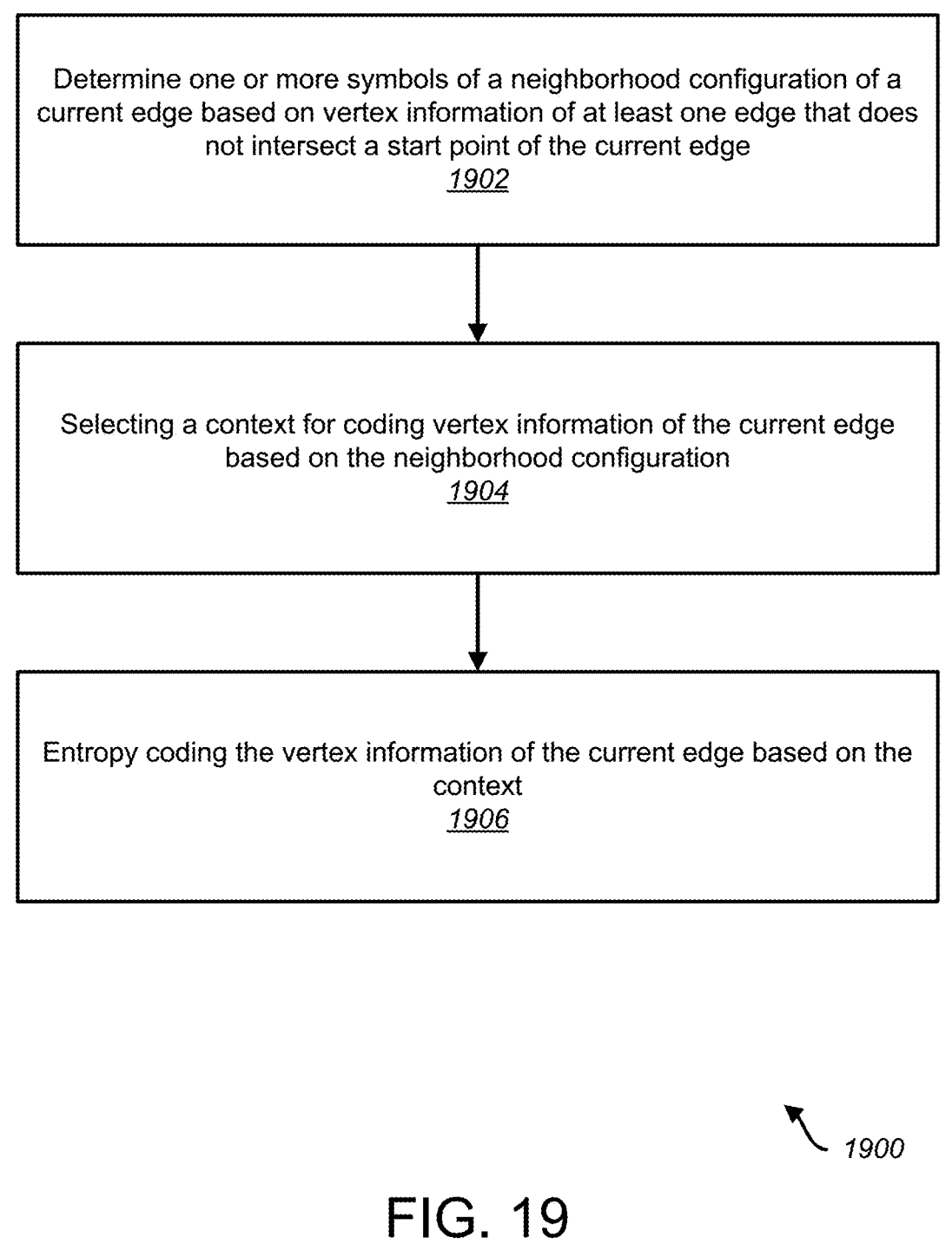

Determine one or more symbols of a neighborhood configuration of a
current edge based on vertex information of at least one edge that does
not intersect a start point of the current edge
*1902*

Selecting a context for coding vertex information of the current edge
based on the neighborhood configuration
*1904*

Entropy coding the vertex information of the current edge based on the
context
*1906*

Figure 20:
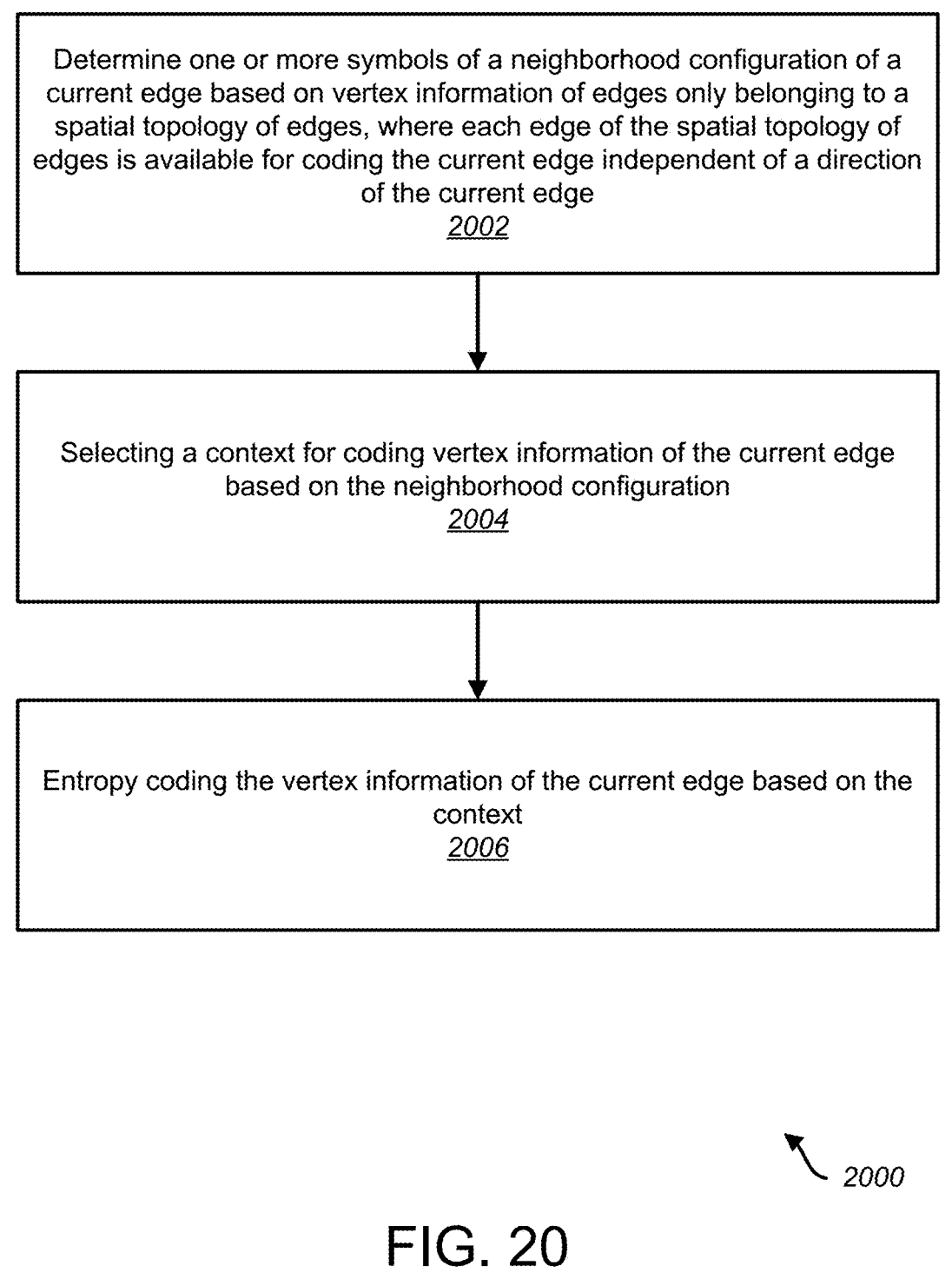

Determine one or more symbols of a neighborhood configuration of a current edge based on vertex information of edges only belonging to a spatial topology of edges, where each edge of the spatial topology of edges is available for coding the current edge independent of a direction of the current edge
_2002_

Selecting a context for coding vertex information of the current edge based on the neighborhood configuration
_2004_

Entropy coding the vertex information of the current edge based on the context
_2006_

ENHANCED EDGE NEIGHBORHOOD FOR CODING VERTEX INFORMATION

CROSS-REFERENCE TO RELATED APPLICATIONS

This application claims the benefit of U.S. Provisional Application No. 63/417,613 filed on Oct. 19, 2022. The above referenced application is hereby incorporated by reference in its entirety.

BACKGROUND

An object or scene may be described using volumetric visual data consisting of a series of points. The points may be stored as a point cloud format that includes a collection of points in three-dimensional space. As point clouds can get quite large in data size, transmitting and processing point cloud data may need a data compression scheme that is specifically designed with respect to the unique characteristics of point clod data.

SUMMARY

The following summary presents a simplified summary of certain features. The summary is not an extensive overview and is not intended to identify key or critical elements.

Coding (e.g., encoding, decoding) may be used to compress and decompress a point cloud frame or sequence for efficient storage and transmission. A point cloud coding system may comprise a source device that encodes a point cloud sequence into a bitstream. The point cloud coding system may also comprise a transmission medium that transmits the encoded bitstream. The point cloud coding system may further comprise a destination device that obtains a decoded point cloud sequence based on the encoded bitstream and store, display, or otherwise process the decoded point cloud sequences. The encoder may code the point cloud using an occupancy tree by recursively splitting the initial volume of the point cloud into cuboids and sub-cuboids. To entropy code a current cuboid, the encoder may use a spatial neighborhood of cuboids relative to the current cuboid. Occupancy configurations for a neighborhood relative to a current cuboid may be reduced by using a mechanism such as Optimal Binary Coders with Update on the Fly (OBUF). Dynamic OBUF may further reduce the number of occupancy configurations for the neighborhood of the current cuboid by a dynamic adaptation to the statistics of already-processed occupancy configurations. The dynamic OBUF may reduce the number of occupancy configurations by using a lookup table of context indices. A point cloud geometry may be set such that the maximum depth of the occupancy tree does not reach the smallest volume size of one voxel. A Triangle Soup (Tri-Soup) scheme may be used, for such point cloud geometries, to represent a vertex with a vertex information made of a presence flag and its position on a TriSoup edge. Vertex information of a TriSoup edge may be entropy coded based on already-coded presence flags and positions of TriSoup edges that neighbor the TriSoup edge that is currently being coded. A topology of edges or a subset of the topology of edges may be selected and used for entropy coding the vertex information of the current TriSoup edge.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 11A, FIG. 11B, and FIG. 11C show TriSoup edges that may be used to entropy code a current TriSoup edge.

FIG. 12A, FIG. 12B, and FIG. 12C show already-coded TriSoup edges that neighbor and do not intersect a start point of a current TriSoup edge.

FIG. 13A, FIG. 13B, and FIG. 13C show already-coded TriSoup edges that neighbor and do not intersect a start point of a current TriSoup edge.

FIG. 14A, FIG. 14B, and FIG. 14C show neighboring already coded edges of a current TriSoup edge.

FIG. 15A, FIG. 15B, and FIG. 15C show an example of a sub-spatial topology of TriSoup edges.

FIG. 16A, FIG. 16B, and FIG. 16C show neighboring already coded edges.

FIG. 17A, FIG. 17B, and FIG. 17C show an example of a sub-spatial topology of TriSoup edges.

FIG. 18A, FIG. 18B, and FIG. 18C show a spatial topology comprising TriSoup edges and TriSoup nodes.

FIG. 19 shows an example method for coding vertex information of a current edge.

FIG. 20 shows an example method for coding vertex information of a current edge.

DETAILED DESCRIPTION

Figure 1:
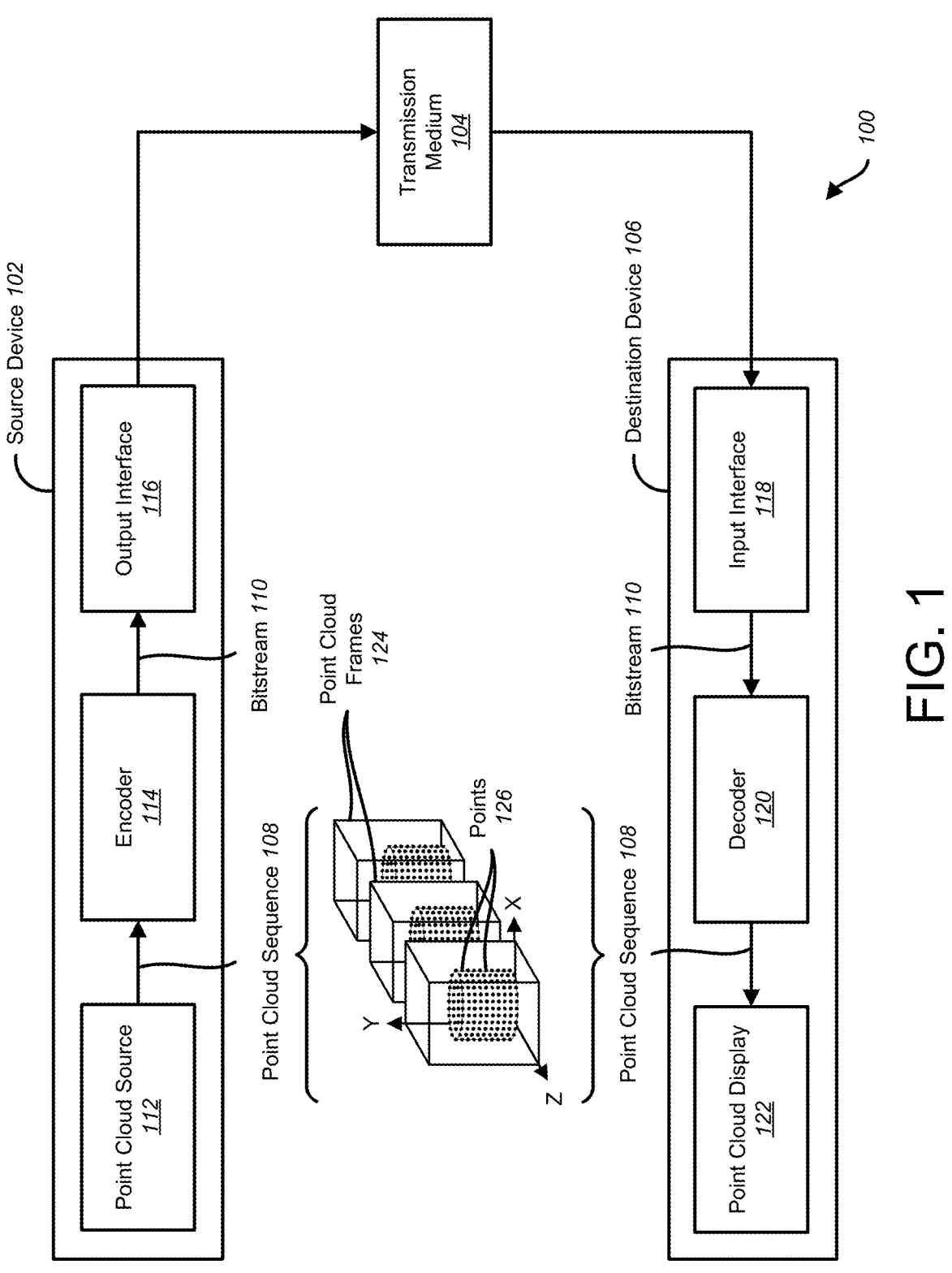
FIG. 1 shows an example point cloud coding system.

The accompanying drawings and descriptions provide examples. It is to be understood that the examples shown in the drawings and/or described are non-exclusive, and that features shown and described may be practiced in other examples. Examples are provided for operation of point cloud or point cloud sequence encoding or decoding systems. More particularly, the technology disclosed herein may relate to point cloud compression as used in encoding and/or decoding devices and/or systems.

Visual data may describe an object or scene using a series of points. Each point may comprise a position in two dimensions (x and y) and one or more optional attributes like color. Volumetric visual data may add another positional dimension to this visual data. Volumetric visual data may describe an object or scene using a series of points that each comprise a position in three dimensions (x, y, and z) and one or more optional attributes like color, reflectance, time stamp, etc. Volumetric visual data may provide a more immersive way to experience visual data, for example, than traditional visual data.

For example, an object or scene described by volumetric visual data may be viewed from any (or multiple) angles, whereas traditional visual data may generally only be viewed from the angle in which it was captured or rendered. Volumetric visual data may be used in many applications, including augmented reality (AR), virtual reality (VR), and mixed reality (MR). Sparse volumetric visual data may be used in the automotive industry for the representation of three-dimensional (3D) maps (e.g., cartography) or as input to assisted driving systems. In the case of assisted driving systems, volumetric visual data may be typically input to driving decision algorithms. Volumetric visual data may be used to store valuable objects in digital form. In applications for preserving cultural heritage, the goal may be to keep a representation of objects that may be threatened by natural disasters. For example, statues, vases, and temples may be entirely scanned and stored as volumetric visual data having several billions of samples. This use-case for volumetric visual data may be particularly relevant for valuable objects in locations where earthquakes, tsunamis, and typhoons are frequent. Volumetric visual data may take the form of a volumetric frame. The volumetric frame may describe an object or scene captured at a particular time instance. Volumetric visual data may take the form of a sequence of volumetric frames (referred to as a volumetric sequence or volumetric video). The sequence of volumetric frames may describe an object or scene captured at multiple different time instances.

Point clouds are one format for storing volumetric visual data. A point cloud may comprise a collection of points in 3D space. Each point in a point cloud may comprise geometry information that indicates the point's position in 3D space. The geometry information may indicate the point's position in 3D space, for example, using three Cartesian coordinates (x, y, and z) or using spherical coordinates (r, phi, theta) (e.g., if acquired by a rotating sensor). The positions of points in a point cloud may be quantized according to a space precision. The space precision may be the same or different in each dimension. The quantization process may create a grid in 3D space. One or more points residing within each sub-grid volume may be mapped to the sub-grid center coordinates, referred to as voxels. A voxel may be considered as a 3D extension of pixels corresponding to the 2D image grid coordinates. A point in a point cloud may further comprise one or more types of attribute information. Attribute information may indicate a property of a point's visual appearance. Attribute information may indicate, for example, a texture (e.g., color) of the point, a material type of the point, transparency information of the point, reflectance information of the point, a normal vector to a surface of the point, a velocity at the point, an acceleration at the point, a time stamp indicating when the point was captured, or a modality indicating how the point was captured (e.g., running, walking, or flying). A point in a point cloud may comprise light field data in the form of multiple view-dependent texture information. Light field data may be another type of optional attribute information.

The points in a point cloud may describe an object or a scene. The points in a point cloud may describe, for example, the external surface and/or the internal structure of an object or scene. The object or scene may be synthetically generated by a computer. The object or scene may be generated from the capture of a real-world object or scene. The geometry information of a real-world object or a scene may be obtained by 3D scanning and/or photogrammetry. 3D scanning may include different types of scanning, for example, laser scanning, structured light scanning, and/or modulated light scanning. 3D scanning may obtain geometry information. 3D scanning may obtain geometry information, for example, by moving one or more laser heads, structured light cameras, and/or modulated light cameras relative to an object or scene being scanned. Photogrammetry may obtain geometry information. Photogrammetry may obtain geometry information, for example, by triangulating the same feature or point in different spatially shifted 2D photographs. Point cloud data may take the form of a point cloud frame. The point cloud frame may describes an object or scene captured at a particular time instance. Point cloud data may take the form of a sequence of point cloud frames. The sequence of point cloud frames may be referred to as a point cloud sequence or point cloud video. The sequence of point cloud frames may describe an object or scene captured at multiple different time instances.

The data size of a point cloud frame or point cloud sequence may be too large for storage and/or transmission in many applications. A single point cloud may comprise, for example, over a million points or even a billions of points. Each point may comprise geometry information and one or more optional types of attribute information. The geometry information of each point may comprise three Cartesian coordinates (x, y, and z) or spherical coordinates (r, phi, theta) that are each represented, for example, using at least 10 bits per component or 30 bits in total. The attribute information of each point may comprise a texture corresponding to three color components (e.g., R, G, and B color components). Each color component may be represented, for example, using 8-10 bits per component or 24-30 bits in total. A single point therefore may comprise at least 54 bits of information in this example, with at least 30 bits of geometry information and at least 24 bits of texture. If a point cloud frame includes a million such points, each point cloud frame may require 54 million bits or 54 megabits to represent. For dynamic point clouds that change over time, at a frame rate of 30 frames per second, a data rate of 1.32 gigabits per second may be required to send (e.g., transmit) the points of the point cloud sequence. Therefore, raw representations of point clouds may require a large amount of data and the practical deployment of point-cloud-based technologies may need compression technologies that enable the storage and distribution of point clouds with reasonable cost.

Encoding may be used to compress and/or reduce the data size of a point cloud frame or point cloud sequence to provide for more efficient storage and/or transmission. Decoding may be used to decompress a compressed point cloud frame or point cloud sequence for display and/or other forms of consumption (e.g., by a machine learning based device, neural network-based device, artificial intelligence-based device, or other forms of consumption by other types of machine-based processing algorithms and/or devices). Compression of point clouds may be lossy (introducing differences relative to the original data) for the distribution to and visualization by an end-user, for example, on AR or VR glasses or any other 3D-capable device. Lossy compression may allow for a high ratio of compression but may imply a trade-off between compression and visual quality perceived by an end-user. Other frameworks, for example, frameworks for medical applications or autonomous driving, may require lossless compression to avoid altering the results of a decision obtained based on the analysis of the sent (e.g., transmitted) and decompressed point cloud frame.

FIG. 1 shows an example point cloud coding (e.g., encoding and/or decoding) system 100. Point cloud coding system 100 may comprise a source device 102, a transmission medium 104, and a destination device 106. Source device 102 may encode a point cloud sequence 108 into a bitstream 110 for more efficient storage and/or transmission. Source device 102 may store and/or send (e.g., transmit) bitstream 110 to destination device 106 via transmission medium 104. Destination device 106 may decode bitstream 110 to display point cloud sequence 108 or for other forms of consumption (e.g., further analysis, storage, etc.). Destination device 106 may receive bitstream 110 from source device 102 via a storage medium or transmission medium 104. Source device 102 and destination device 106 may include any number of different devices. Source device 102 and destination device 106 may include, for example, cluster of interconnected computer systems acting as a pool of seamless resources (also referred to as a cloud of computers or cloud computer), a server, a desktop computer, a laptop computer, a tablet computer, a smart phone, a wearable device, a television, a camera, a video gaming console, a set-top box, a video streaming device, a vehicle (e.g., an autonomous vehicle), or a head-mounted display. A head-mounted display may allow a user to view a VR, AR, or MR scene and adjust the view of the scene based on movement of the user's head. A head-mounted display may be tethered to a processing device (e.g., a server, a desktop computer, a set-top box, or a video gaming counsel) or may be fully self-contained.

Source device 102 may comprise a point cloud source 112, an encoder 114, and an output interface 116. To encode point cloud sequence 108 into bitstream 110, source device 102 may comprise a point cloud source 112, an encoder 114, and an output interface 116. Point cloud source 112 may provide or generate point cloud sequence 108 from a capture of a natural scene and/or a synthetically generated scene. A synthetically generated scene may be a scene comprising computer generated graphics. Point cloud source 112 may comprise one or more point cloud capture devices, a point cloud archive comprising previously captured natural scenes and/or synthetically generated scenes, a point cloud feed interface to receive captured natural scenes and/or synthetically generated scenes from a point cloud content provider, and/or a processor(s) to generate synthetic point cloud scenes. The point cloud capture devices may include, for example, one or more laser scanning devices, structured light scanning devices, modulated light scanning devices, and/or passive scanning devices.

As shown in FIG. 1, a point cloud sequence 108 may comprise a series of point cloud frames 124. A point cloud frame may describe an object or scene captured at a particular time instance. Point cloud sequence 108 may achieve the impression of motion by using a constant or variable time to successively present point cloud frames 124 of point cloud sequence 108. A point cloud frame may comprise a collection of points (e.g., voxels) 126 in 3D space. Each point 126 may comprise geometry information that indicates the point's position in 3D space. The geometry information may indicate, for example, the point's position in 3D space using three Cartesian coordinates (x, y, and z). One or more of points 126 may further comprise one or more types of attribute information. Attribute information may indicate a property of a point's visual appearance. Attribute information may indicate, for example, a texture (e.g., color) of a point, a material type of a point, transparency information of a point, reflectance information of a point, a normal vector to a surface of a point, a velocity at a point, an acceleration at a point, a time stamp indicating when a point was captured, a modality indicating how a point was captured (e.g., running, walking, or flying). One or more of points 126 may comprise, for example, light field data in the form of multiple view-dependent texture information. Light field data may be another type of optional attribute information. Color attribute information of one or more of points 126 may comprise a luminance value and two chrominance values. The luminance value may represent the brightness (e.g., luma component, Y) of the point. The chrominance values may respectively represent the blue and red components of the point (e.g., chroma components, Cb and Cr) separate from the brightness. Other color attribute values may be represented based on different color schemes (e.g., an RGB or monochrome color scheme).

Encoder 114 may encode point cloud sequence 108 into bitstream 110. To encode point cloud sequence 108, encoder 114 may use one or more lossless or lossy compression techniques to reduce redundant information in point cloud sequence 108. To encode point cloud sequence 108, encoder 114 may use one or more prediction techniques to reduce redundant information in point cloud sequence 108. Redundant information is information that may be predicted at a decoder 120 and therefore may not be needed to be sent (e.g., transmitted) to decoder 120 for accurate decoding of point cloud sequence 108. For example, Motion Picture Expert Group (MPEG) introduced a geometry-based point cloud compression (G-PCC) standard (ISO/IEC standard 23090-9: Geometry-based point cloud compression). G-PCC specifies the encoded bitstream syntax and semantics for transmission and/or storage of a compressed point cloud frame and the decoder operation for reconstructing the compressed point cloud frame from the bitstream. During standardization of G-PCC, a reference software (ISO/IEC standard 23090-21: Reference Software for G-PCC) was developed to encode the geometry and attribute information of a point cloud frame. To encode geometry information of a point cloud frame, the G-PCC reference software encoder may perform voxelization. The G-PCC reference software encoder may perform voxelization, for example, by quantizing positions of points in a point cloud. Quantizing positions of points in a point cloud may create a grid in 3D space. The G-PCC reference software encoder may map the points to the center coordinates of the sub-grid volume (e.g., voxel) that their quantized locations reside in. The G-PCC reference software encoder may perform geometry analysis using an occupancy tree to compress the geometry information. The G-PCC reference software encoder may entropy encode the result of the geometry analysis to further compress the geometry information. To encode attribute information of a point cloud, the G-PCC reference software encoder may use a transform tool, such as Region Adaptive Hierarchical Transform (RAHT), the Predicting Transform, and/or the Lifting Transform. The Lifting Transform may be built on top of the Predicting Transform. The Lifting Transform may include an extra update/lifting step. The Lifting Transform and the Predicting Transform may be referred to as Predicting/Lifting Transform or pred lift. Encoder 114 may operate in a same or similar manner to an encoder provided by the G-PCC reference software.

Output interface 116 may be configured to write and/or store bitstream 110 onto transmission medium 104. The bitstream 110 may be sent (e.g., transmitted) to destination device 106. In addition or alternatively, output interface 116 may be configured to send (e.g., transmit), upload, and/or stream bitstream 110 to destination device 106 via transmission medium 104. Output interface 116 may comprise a wired and/or wireless transmitter configured to send (e.g., transmit), upload, and/or stream bitstream 110 according to one or more proprietary and/or standardized communication protocols. The one or more proprietary and/or standardized communication protocols may include, for example, Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. Transmission medium 104 may comprise, for example, one or more wires, cables, air interfaces, optical discs, flash memory, and/or magnetic memory. In addition, or alternatively, transmission medium 104 may comprise one or more networks (e.g., the Internet) or file server(s) configured to store and/or send (e.g., transmit) encoded video data (e.g., bitstream 110).

Destination device 106 may comprise an input interface 118, a decoder 120, and a point cloud display 122. To decode bitstream 110 into point cloud sequence 108 for display or other forms of consumption, destination device 106 may comprise an input interface 118, a decoder 120, and a point cloud display 122. Input interface 118 may be configured to read bitstream 110 stored on transmission medium 104. Bitstream 110 may be stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Decoder 120 may decode point cloud sequence 108 from encoded bitstream 110. Decoder 120 may operate, for example, in a same or similar manner as a decoder provided by G-PCC reference software. Decoder 120 may decode a point cloud sequence that approximates point cloud sequence 108. Decoder 120 may decode a point cloud sequence that approximates point cloud sequence 108 due to, for example, lossy compression of point cloud sequence 108 by encoder 114 and/or errors introduced into encoded bitstream 110, for example, if transmission to destination device 106 occurs.

Point cloud display 122 may display point cloud sequence 108 to a user. Point cloud display 122 may comprise, for example, a cathode rate tube (CRT) display, a liquid crystal display (LCD), a plasma display, a light emitting diode (LED) display, a 3D display, a holographic display, a head-mounted display, or any other display device suitable for displaying point cloud sequence 108.

Point cloud coding/decoding system 100 is presented by way of example and not limitation. In the example of FIG. 1, point cloud coding/decoding system 100 may have other components and/or arrangements. Point cloud source 112 may, for example, be external to source device 102. Point cloud display device 122 may, for example, be external to destination device 106 or omitted altogether where point cloud sequence is intended for consumption by a machine and/or storage device. Source device 102 may further comprise, for example, a point cloud decoder. Destination device 104 may comprise, for example, a point cloud encoder. Source device 102 may be configured to further receive an encoded bit stream from destination device 106. Receiving an encoded bit stream from destination device 106 may support two-way point cloud transmission between the devices.

As described herein, an encoder may quantize the positions of points in a point cloud according to a space precision, which may be the same or different in each dimension of the points. The quantization process may create a grid in 3D space. The encoder may map any points residing within each sub-grid volume to the sub-grid center coordinates, referred to as a voxel. A voxel may be considered as a 3D extension of pixels corresponding to 2D image grid coordinates.

The encoder may represent or code the voxelized point cloud. The encoder may represent or code the voxelized point cloud, for example, using an occupancy tree. The encoder may split the initial volume or cuboid containing the voxelized point cloud into sub-cuboids. The initial volume or cuboid may be referred to as a bounding box. A cuboid may be, for example, a cube. The encoder may recursively split each sub-cuboid that contains at least one point of the point cloud. The encoder may not further split sub-cuboids that do not contain at least one point of the point cloud. A sub-cuboid that contains at least one point of the point cloud may be referred to as an occupied sub-cuboid. A sub-cuboid that does not contain at least one point of the point cloud may be referred to as an unoccupied sub-cuboid. The encoder may split an occupied cuboid into, for example, two sub-cuboids (to form a binary tree), four sub-cuboids (to form a quadtree), or eight sub-cuboids (to form an octree). The encoder may split an occupied cuboid to obtain sub-cuboids. The sub-cuboids may have the same size and shape at a given depth level of the occupancy tree. The sub-cuboids may have the same size and shape at a given depth level of the occupancy tree, for example, if the encoder splits the occupied cuboid along a plane passing through the middle of edges of the cuboid.

The initial volume or cuboid containing the voxelized point cloud may correspond to the root node of the occupancy tree. Each occupied sub-cuboid, split from the initial volume, may correspond to a node (of the root node) in a second level of the occupancy tree. Each occupied sub-cuboid, split from an occupied sub-cuboid in the second level, may correspond to a node (off the occupied sub-cuboid in the second level from which it was split) in a third level of the occupancy tree. The occupancy tree structure may continue to form in this manner for each recursive split iteration until, for example, some maximum depth level of the occupancy tree is reached or each occupied sub-cuboid has a volume corresponding to one voxel.

Each non-leaf node of the occupancy tree may comprise or be associated with an occupancy word representing the occupancy state of the cuboid corresponding to the node. A node of the occupancy tree corresponding to a cuboid that is split into 8 sub-cuboids may comprise or be associated with a 1-byte occupancy word. Each bit (referred to as an occupancy bit) of the 1-byte occupancy word may represent or indicate the occupancy of a different one of the eight sub-cuboids. Occupied sub-cuboids may be each represented or indicated by a binary "1" in the 1-byte occupancy word. Unoccupied sub-cuboids may be each represented or indicated by a binary "0" in the 1-byte occupancy word. Occupied and un-occupied sub-cuboids may be represented or indicated by opposite 1-bit binary values (e.g., a binary "0" representing or indicating an occupied sub-cuboid and a binary "1" representing or indicating an unoccupied sub-cuboid) in the 1-byte occupancy word.

Each bit of an occupancy word may represent or indicate the occupancy of a different one of the eight sub-cuboids. Each bit of an occupancy word may represent or indicate the occupancy of a different one of the eight sub-cuboids, for example, following the so-called Morton order. The least significant bit of an occupancy word may represent or indicate, for example, the occupancy of a first one of the eight sub-cuboids following the Morton order. The second least significant bit of an occupancy word may represent or indicate, for example, the occupancy of a second one of the eight sub-cuboids following the Morton order, etc.

Figure 2:
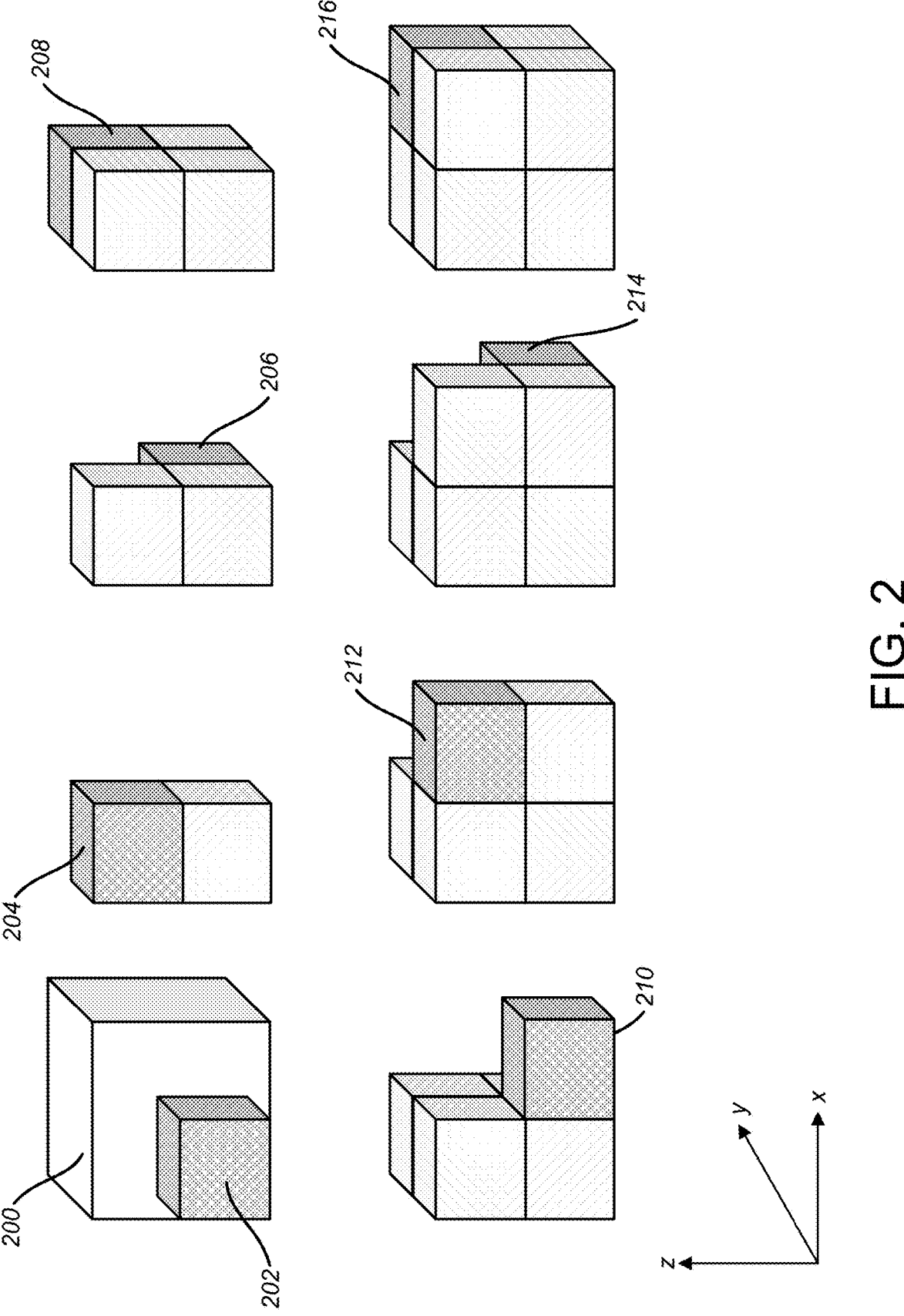
FIG. 2 shows a Morton order of eight sub-cuboids split from a cuboid.

FIG. 2 shows the Morton order of eight sub-cuboids 202-216 split from a cuboid 200. Sub-cuboids 202-216 are labeled based on their Morton order, with child node 202 being the first in Morton order and child node 216 being the last in Morton order. The Morton order for sub-cuboids 202-216 is a local lexicographic order in xyz.

The geometry of the voxelized point cloud is represented by, and may be determined from, the initial volume and the occupancy words of the nodes in the occupancy tree. The encoder may send (e.g., transmit) the initial volume and the occupancy words of the nodes in the occupancy tree in a bitstream to a decoder for reconstructing the point cloud. The encoder may entropy encode the occupancy words. The encoder may entropy encode the occupancy words, for example, before sending the initial volume and the occupancy words of the nodes in the occupancy tree. The encoder may encode an occupancy bit of an occupancy word of a node corresponding to a cuboid. The encoder may encode an occupancy bit of an occupancy word of a node corresponding to a cuboid, for example, based on one or more occupancy bits of occupancy words of other nodes corresponding to cuboids that are adjacent or spatially close to the cuboid of the occupancy bit being encoded.

An encoder and/or decoder may code occupancy bits of occupancy words in sequence of a scan order. The scan order may also be referred to as a scanning order. An encoder and/or decoder may scan an occupancy tree in breadth-first order. All the occupancy words of the nodes of a given depth (e.g., level) within the occupancy tree may be scanned. All the occupancy words of the nodes of a given depth (e.g., level) within the occupancy tree may be scanned, for example, before scanning the occupancy words of the nodes of the next depth (e.g., level). Within a given depth, the encoder and/or decoder may scan the occupancy words of nodes in the Morton order. Within a given node, the encoder and/or decoder may scan the occupancy bits of the occupancy word of the node further in the Morton order.

Figure 3:
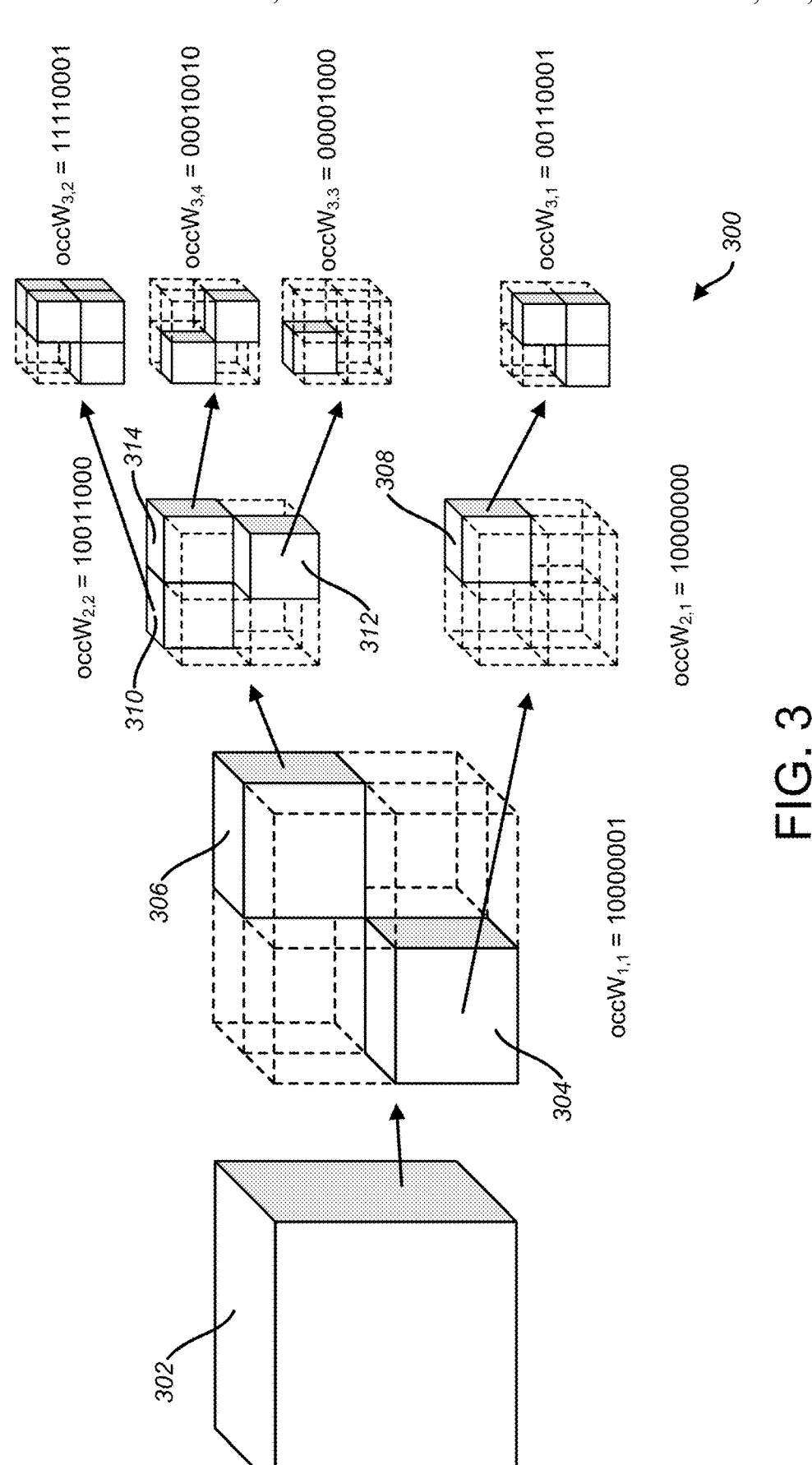
FIG. 3 shows an example of a scanning order for an occupancy tree.

FIG. 3 shows an example of a scanning order (e.g., breadth-first order as described herein) for an occupancy tree 300. FIG. 3 shows a scanning order for the first three example levels of occupancy tree 300. In FIG. 3, a cuboid 302 corresponding to the root node of occupancy tree 300 may be divided into eight sub-cuboids. Two sub-cuboids 304 and 306 of the eight sub-cuboids may be occupied. The other six sub-cuboids of the eight sub-cuboids may be unoccupied. Following the Morton order, a first eight-bit occupancy word $occW_{1,1}$ is constructed to represent the occupancy word of the root node. The least significant occupancy bit of the first eight-bit occupancy word $occW_{1,1}$ represents or indicates the occupancy of the first sub-cuboid of the eight sub-cuboids in Morton order. The second least significant occupancy bit of the first eight-bit occupancy word $occW_{1,1}$ represents or indicates the occupancy of the second sub-cuboid of the eight sub-cuboids in Morton order, etc.

Each of the two occupied sub-cuboids 304 and 306 corresponds to a node off the root node in a second level of occupancy tree 300. The two occupied sub-cuboids 304 and 306 are each further split into eight sub-cuboids. One of the sub-cuboids 308 of the eight sub-cuboids split from sub-cuboid 304 may be occupied. The other seven sub-cuboids of the eight sub-cuboids split from sub-cuboid 304 may be unoccupied. Three of the sub-cuboids 310, 312, and 314 of the eight sub-cuboids split from sub-cuboid 306 may be occupied. The other five sub-cuboids of the eight sub-cuboids split from sub-cuboid 306 may be unoccupied. Two second eight-bit occupancy words $occW_{2,1}$ and $occW_{2,2}$ are constructed in this order to respectively represent the occupancy word of the node corresponding to sub-cuboid 304 and the occupancy word of the node corresponding to sub-cuboid 306.

Each of the four occupied sub-cuboids 308, 310, 312, and 314 corresponds to a node in a third level of occupancy tree 300. The four occupied sub-cuboids 308, 310, 312, and 314 are each further split into eight sub-cuboids or 32 sub-cuboids in total. Four third level eight-bit occupancy words $occW_{3,1}$, $occW_{3,2}$, $occW_{3,3}$ and $occW_{3,4}$ are constructed in this order to respectively represent the occupancy word of the node corresponding to sub-cuboid 308, the occupancy word of the node corresponding to sub-cuboid 310, the occupancy word of the node corresponding to sub-cuboid 312, and the occupancy word of the node corresponding to sub-cuboid 314.

The occupancy words of occupancy tree 300 may be entropy coded (e.g., entropy encoded by an encoder and entropy decoded by a decoder) as the succession of the seven occupancy words $occW_{1,1}$ to $occW_{3,4}$, for example, following the scanning order (e.g., breadth-first order) as described herein. As a consequence of the breadth-first scanning order, the occupancy word(s) of all node(s) having the same depth (e.g., level) as a current parent node may have already been entropy coded, for example, if the occupancy word of a current child node belonging to the current parent node is being entropy coded. The occupancy word(s) of all node(s) having the same depth (e.g., level) as the current child node and having a lower Morton order than the current child node may have also already been entropy coded, for example, if the occupancy word for the current child node is being entropy coded. Part of the already coded occupancy word(s) may be used to entropy code the occupancy word of the current child node. The already coded occupancy word(s) of neighboring parent and/or child node(s) may be used, for example, to entropy code the occupancy word of the current child node. The occupancy bit(s) of the occupancy word having a lower Morton order than a particular occupancy bit of the occupancy word of the current child node may have also already been entropy coded. The occupancy bit(s) of the occupancy word having a lower Morton order than a particular occupancy bit may be used to code the occupancy bit of the occupancy word of the current child node, for example, if the particular occupancy bit is being coded.

Figure 4:
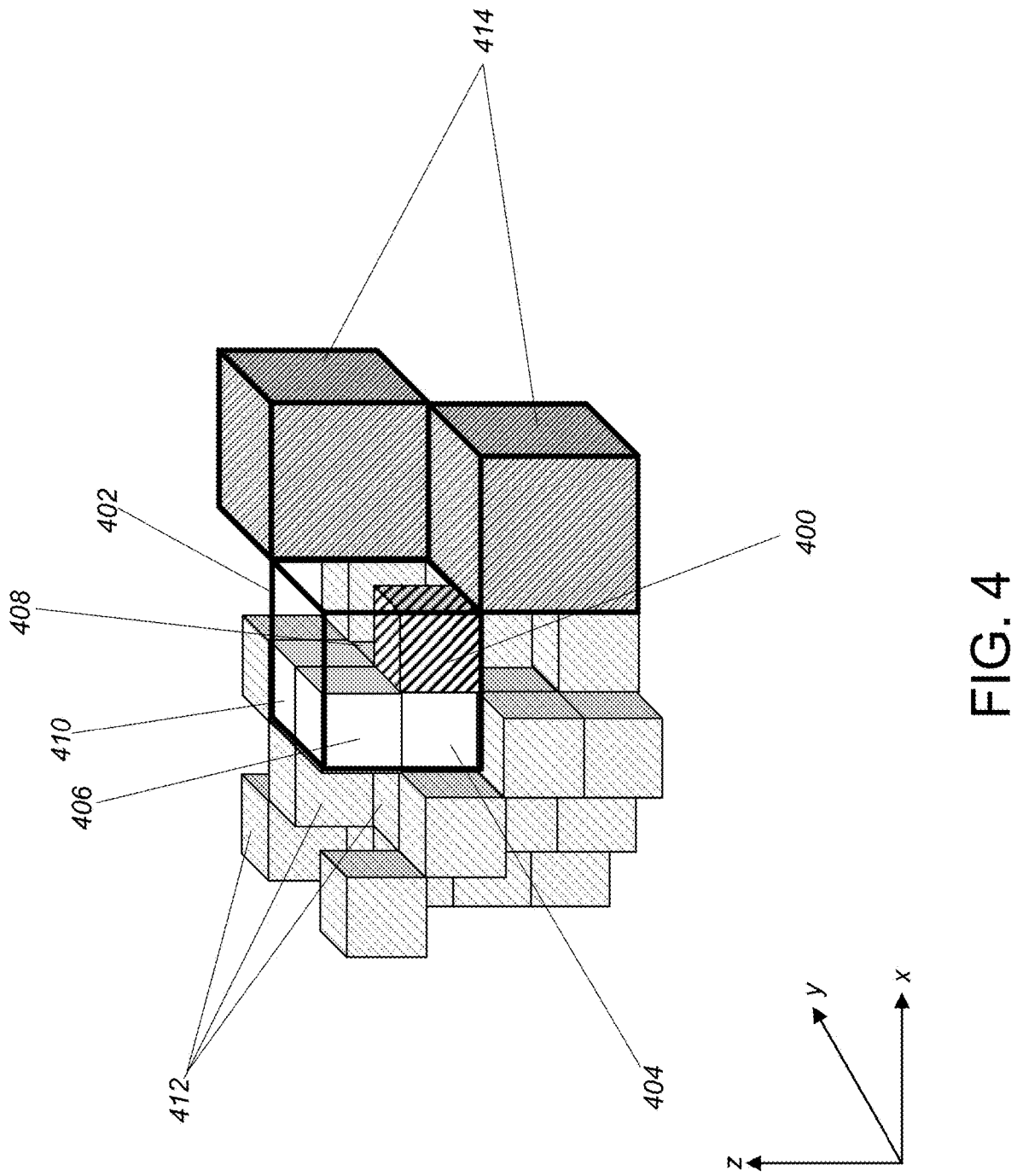
FIG. 4 shows an example neighborhood of cuboids for entropy coding the occupancy of a child cuboid.

FIG. 4 shows an example neighborhood of cuboids for entropy coding the occupancy of a child cuboid. A neighborhood of cuboids with already-coded occupancy bits may be used to entropy code the occupancy bit of a current child cuboid 400. The neighborhood of cuboids with already-coded occupancy bits may be determined. The neighborhood of cuboids with already-coded occupancy bits may be determined, for example, based on the scanning order of an occupancy tree representing the geometry of the cuboids in FIG. 4 as described herein. The neighborhood of cuboids, of a current child cuboid, may include one or more of: a cuboid adjacent to the current child cuboid, a cuboid sharing a vertex with the current child cuboid, a cuboid sharing an edge with the current child cuboid, a cuboid sharing a face with the current child cuboid, a parent cuboid adjacent to the current child cuboid, a parent cuboid sharing a vertex with the current child cuboid, a parent cuboid sharing an edge with the current child cuboid, a parent cuboid sharing a face with the current child cuboid, a parent cuboid adjacent to the current parent cuboid, a parent cuboid sharing a vertex with the current parent cuboid, a parent cuboid sharing an edge with the current parent cuboid, a parent cuboid sharing a face with the current parent cuboid, etc. As shown in FIG. 4, current child cuboid 400 may belong to a current parent cuboid 402. Following the scanning order of the occupancy words and occupancy bits of nodes of the occupancy tree, the occupancy bits of four child cuboids 404, 406, 408, and 410, belonging to the same current parent cuboid 402, have already been coded. The occupancy bits of child cuboids 412 of preceding parent cuboids have already been coded. The occupancy bits of parent cuboids 414, for which the occupancy bits of child cuboids have not already been coded, have already been coded. Therefore, the already-coded occupancy bits of cuboids 404, 406, 408, 410, 412, and 414 may be used to code the occupancy bit of the current child cuboid 400.

The number (e.g., quantity) of possible occupancy configurations (e.g., sets of one or more occupancy words and/or occupancy bits) for a neighborhood of a current child cuboid may be $2^N$, where N is the number (e.g., quantity) of cuboids in the neighborhood of the current child cuboid with already-coded occupancy bits. The neighborhood of the current child cuboid may comprise several dozens of cuboids. The neighborhood of the current child cuboid may comprise the 26 adjacent parent cuboids sharing a face, an, edge, and/or a vertex with the parent cuboid of the current child cuboid and also several adjacent child cuboids sharing a face, an edge, and/or a vertex with the current child cuboid. The occupancy configuration for a neighborhood of the current child cuboid may have billions of possible occupancy configurations, even limited to a subset of the adjacent cuboids, making its direct use impractical. An encoder and/or decoder may use the occupancy configuration for a neighborhood of the current child cuboid to select the context (e.g., a probability model), among a set of contexts, of a binary entropy coder (e.g., binary arithmetic coder) that codes the occupancy bit of the current child cuboid. The context-based binary entropy coding may be similar to the Context Adaptive Binary Arithmetic Coder (CABAC) used in MPEG-H Part 2 (also known as High Efficiency Video Coding (HEVC)).

An encoder and/or decoder may use several methods to reduce the occupancy configurations for a neighborhood of a current child cuboid being coded to a practical number (e.g., quantity) of reduced occupancy configurations. The $2^6$ or 64 occupancy configurations of the six adjacent parent cuboids sharing a face with the parent cuboid of the current child cuboid may be reduced to nine occupancy configurations. The occupancy configurations may be reduced by using geometry invariance. An occupancy score for the current child cuboid may be obtained from the $2^{26}$ occupancy configurations of the 26 adjacent parent cuboids. The score may be further reduced into a ternary occupancy prediction (e.g., "predicted occupied," "unsure," or "predicted unoccupied") by using score thresholds. The number (e.g., quantity) of occupied adjacent child cuboids and the number (e.g., quantity) of unoccupied adjacent child cuboids may be used instead of the individual occupancies of these child cuboids.

An encoder and/or decoder may reduce the number (e.g., quantity) of possible occupancy configurations for a neighborhood of a current child cuboid to a more manageable number (e.g., a few thousands). It has been observed that instead of associating a reduced number (e.g., quantity) of contexts (e.g., probability models) directly to the reduced occupancy configurations, another mechanism may be used, namely Optimal Binary Coders with Update on the Fly (OBUF). An encoder and/or decoder may implement OBUF to limit the number (e.g., quantity) of contexts to a lower number (e.g., 32 contexts).

OBUF may use a limited number (e.g., 32) of contexts (e.g., probability models). The number (e.g., quantity) of contexts in OBUF may be a fixed number (e.g., fixed quantity). The contexts used by OBUF may be ordered, referred to by a context index (e.g., a context index in the range of 0 to 31), and associated from a lowest virtual probability to a highest virtual probability to code a "1." A Look-Up Table (LUT) of context indices may be initialized at the beginning of a point cloud coding process. The LUT may initially point to a context with the median virtual probability to code a "1" for all input. The LUT may initially point to a context with the median virtual probability to code a "1," among the limited number (e.g., quantity) of contexts, for all input. This LUT may take an occupancy configuration for a neighborhood of current child cuboid as input and output the context index associated with the occupancy configuration. The LUT may have as many entries as reduced occupancy configurations (e.g., around a few thousand entries). The coding of the occupancy bit of a current child cuboid may comprise the steps of determining the reduced occupancy configuration of the current child node, obtaining a context index by using the reduced occupancy configuration as an entry to the LUT, coding the occupancy bit of the current child cuboid by using the context pointed to (e.g., indicated) by the context index, and updating the LUT entry corresponding to the reduced occupancy configuration. The LUT entry may be updated, for example, based on the value of the coded occupancy bit of the current child cuboid. For a binary "0" (e.g., indicating the current child cuboid is unoccupied) being coded, the LUT entry may be decreased to a lower context index value (e.g., associated with a lower virtual probability). For a binary "1" (e.g., indicating the current child cuboid is occupied) being coded, the LUT entry may be increased to a higher context index value (e.g., associated with a higher virtual probability). The update process of the context index may be based on a theoretical model of optimal distribution for virtual probabilities associated with the limited number (e.g., quantity) of contexts. This virtual probability may be fixed by a model. This virtual probability may be different from the internal probability of the context that evolves during the coding of bits of data. The evolution of the internal context may follow a well-known process similar to the process in CABAC.

An encoder and/or decoder may implement a "dynamic OBUF" scheme. The "dynamic OBUF" scheme may handle a much larger number (e.g., quantity) of occupancy configurations for a neighborhood of a current child cuboid than general OBUF. The use of a larger number (e.g., quantity) of occupancy configurations for a neighborhood of a current child cuboid may lead to improved compression capabilities. The use of a larger number (e.g., quantity) of occupancy configurations for a neighborhood of a current child cuboid may also maintain complexity within reasonable bounds. By using an occupancy tree compressed by OBUF, an encoder and/or decoder may reach a lossless compression performance as good as 1 bit per point (bpp) for coding the geometry of dense point clouds. An encoder and/or decoder may implement dynamic OBUF to potentially further reduce the bit rate by more than 25% to 0.7 bpp.

OBUF may not take as input a large variety of reduced occupancy configurations for a neighborhood of a current child cuboid. This may potentially lead to a loss of useful correlation. With OBUF, the size of the LUT of context indices may be increased to handle more various occupancy configurations for a neighborhood of a current child cuboid as input. By doing so, statistics may be diluted, and compression performance may be worsened. For example, if the LUT has millions of entries and the point cloud has a hundred thousand points, then most of the entries are never visited (e.g., looked up, accessed, etc.). In some instances, many entries may be visited only a few times and their associated context index may not be updated enough times to reflect any meaningful correlation between the occupancy configuration value and the probability of occupancy of the current child cuboid. Dynamic OBUF may be implemented to mitigate the dilution of statistics due to the increase of the number (e.g., quantity) of occupancy configurations for a neighborhood of a current child cuboid. This mitigation is performed by a "dynamic reduction" of occupancy configurations in dynamic OBUF.

Dynamic OBUF may add an extra step of reduction of occupancy configurations for a neighborhood of a current child cuboid. Dynamic OBUF may add an extra step of reduction of occupancy configurations for a neighborhood of a current child cuboid, for example, before using the LUT of context indices. This step may be called a dynamic reduction because it evolves based on the progress of the coding of the point cloud or, more precisely, based on already visited (e.g., looked up in the LUT) occupancy configurations.

As described herein, many possible occupancy configurations for a neighborhood of a current child cuboid are potentially involved but only a subset may be visited, for example, if the coding of a point cloud occurs. This subset of visited occupancy configurations may characterize the type of the point cloud. For example, most of the visited occupancy configurations may exhibit occupied adjacent cuboids of a current child cuboid, for example, if AR or VR dense point clouds are being coded. On the other hand, most of the visited occupancy configurations may exhibit only a few occupied adjacent cuboids of a current child cuboid, for example, if sensor-acquired sparse point clouds are being coded. The role of the dynamic reduction may be to obtain a more precise correlation based on the most visited occupancy configuration, for example, by putting aside (e.g., reducing aggressively) other occupancy configurations that are much less visited. The dynamic reduction may be updated on-the-fly. The dynamic reduction may be updated on-the-fly. The dynamic reduction may be updated on-the-fly, for example, after each visit (e.g., a lookup in the LUT) of an occupancy configuration. A visit (e.g., a lookup in the LUT) of an occupancy configuration may occur, for example, if the coding of occupancy data occurs.

Figure 5:
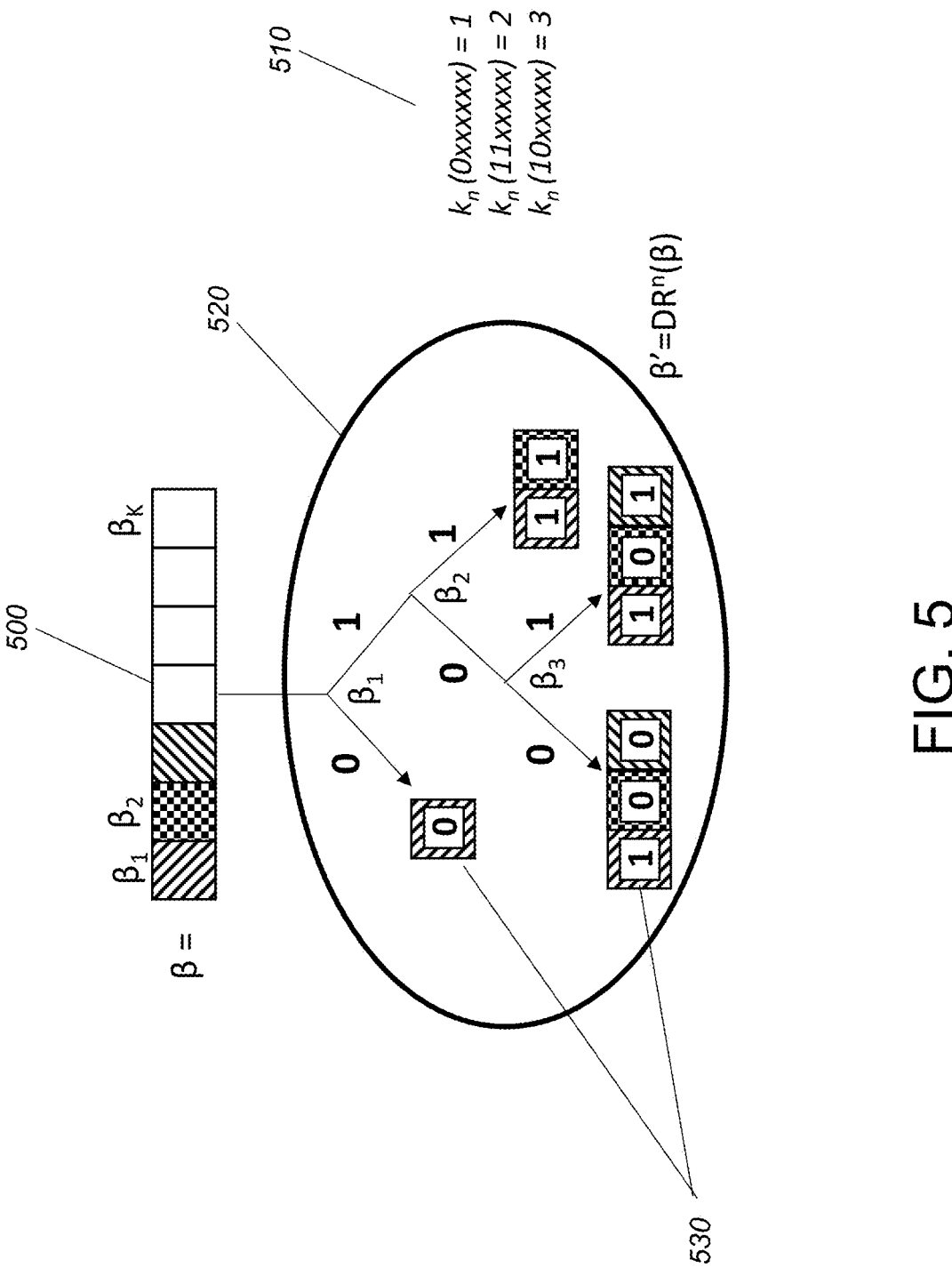
FIG. 5 shows an example of a dynamic reduction function (DR) that may be used in dynamic OBUF.

FIG. 5 shows an example of a dynamic reduction function (DR) that may be used in dynamic OBUF. The dynamic reduction function (DR) may be obtained by masking bits $\beta_j$ of occupancy configurations 500, $$\beta = \beta_1 \dots \beta_K,$$

made of K bits. The size of the mask may decrease, for example, if occupancy configurations are visited (e.g., looked up in the LUT) a certain number (e.g., quantity) of times. The initial dynamic reduction function $DR^0$ may mask all bits for all occupancy configurations such that it is a constant function $DR^0(\beta)=0$ for all occupancy configurations $\beta$. The dynamic reduction function may evolve from a function $DR^n$ to an updated function $DR^{n+1}$. The dynamic reduction function may evolve from a function $DR^n$ to an updated function $DR^{n+1}$, for example, after each coding of an occupancy bit. The function may be defined by $$\beta' = DR^n(\beta) = \beta_1 \dots \beta_{k_n(\beta)},$$

where $k_n(\beta)$ 510 is the number (e.g., quantity) of non-masked bits. The initialization of $DR^0$ may correspond to $k_0(\beta)=0$, and the natural evolution of the reduction function toward finer statistics may lead to an increasing number (e.g., quantity) of non-masked bits $k_n(\beta) \leq k_{n+1}(\beta)$. The dynamic reduction function may be entirely determined by the values of $k_n$ for all occupancy configurations $\beta$.

The visits (e.g., instances of a lookup in the LUT) to occupancy configurations may be tracked by a variable $NV(\beta')$ for all dynamically reduced occupancy configurations $\beta' = DR^n(\beta)$. The corresponding number (e.g., quantity) of visits $NV(\beta^{V_i})$ may be increased by one. The corresponding number (e.g., quantity) of visits $NV(\beta^{V_i})$ may be increased by one, for example, after each instance of coding of an occupancy bit based on an occupancy configuration $\beta^V$. If this number (e.g., quantity) of visits $NV(\beta^{V_i})$ is greater than a threshold $th_V$, $$NV(\beta^{V_i}) > th_V,$$

then the number (e.g., quantity) of unmasked bits $k_n(\beta)$ may be increased by one for all occupancy configurations $\beta$ being dynamically reduced to $\beta^{V_i}$. This corresponds to replacing the dynamically reduced occupancy configuration $\beta^{V_i}$ by the two new dynamically reduced occupancy configurations $\beta^{0_i}$ and $\beta^{1_i}$ defined by $$\beta^{0_i} = \beta^{V_i}0 = \beta^V_1 \dots \beta^V_{kn(\beta)}0, \text{ and } \beta^{1_i} = \beta^{V_i}1 = \beta^V_1 \dots \beta^V_{kn(\beta)}1.$$

In other words, the number (e.g., quantity) of unmasked bits has been increased by one $k_{n+1}(\beta)=k_n(\beta)+1$ for all occupancy configurations $\beta$ such that $DR^n(\beta)=\beta^{V_i}$. The number (e.g., quantity) of visits of the two new dynamically reduced occupancy configurations may be initialized to zero, $$NV(\beta^{0_i}) = NV(\beta^{1_i}) = 0. \tag{I}$$

At the start of the coding, the initial number (e.g., quantity) of visits for the initial dynamic reduction function $DR^0$ may be set to $$NV(DR^0(\beta)) = NV(0) = 0,$$

and the evolution of NV on dynamically reduced occupancy configurations may be entirely defined.

The corresponding LUT entry $LUT[\beta^{V_i}]$ may be replaced by the two new entries $LUT[\beta^{0_i}]$ and $LUT[\beta^{1_i}]$ that are initialized by the coder index associated with $\beta^{V_i}$. The corresponding LUT entry $LUT[\beta^{V_i}]$ may be replaced by the two new entries $LUT[\beta^{0_i}]$ and $LUT[\beta^{1_i}]$ that are initialized by the coder index associated with $\beta^{V_1}$, for example, if a dynamically reduced occupancy configuration $\beta^{V_1}$ is replaced by the two new dynamically reduced occupancy configurations $\beta^{0_1}$ and $\beta^{1_1}$, $$LUT[\beta^{0_1}]=LUT[\beta^{1_1}]=LUT[\beta^{V_1}], \qquad (II)$$

and then evolve separately. The evolution of the LUT of coder indices on dynamically reduced occupancy configurations may be entirely defined.

The reduction function $DR''$ may be modeled by a series of growing binary trees $T''$ 520 whose leaf nodes 530 are the reduced occupancy configurations $\beta'=DR''(\beta)$. The initial tree may be the single root node associated with $0=DR^0(\beta)$. The replacement of the dynamically reduced to $\beta^{V_1}$ by $\beta^{0_1}$ and $\beta^{1_1}$ corresponds to growing the tree $T''$ from the leaf node associated with $\beta^{V_1}$. The replacement of the dynamically reduced to $\beta^{V_1}$ by $\beta^{0_1}$ and $\beta^{1_1}$ corresponds to growing the tree $T''$ from the leaf node associated with $\beta^{V_1}$, for example, by attaching to it two new nodes associated with $\beta^{0_1}$ and $\beta^{1_1}$. The tree $T''^{+1}$ may be obtained by this growth. The number (e.g., quantity) of visits NV and the LUT of context indices may be defined on the leaf nodes and evolve with the growth of the tree through equations (I) and (II).

The practical implementation of dynamic OBUF may be made by the storage of the array $NV[\beta']$ and the $LUT[\beta']$ of context indices, as well as the trees $T''$ 520. An alternative to the storage of the trees may be to store the array $k_n[\beta]$ 510 of the number (e.g., quantity) of non-masked bits.

A limitation for implementing dynamic OBUF may be its memory footprint. In some instances, a few million occupancy configurations may be practically handled, leading to about 20 bits $\beta_i$ constituting an entry configuration $\beta$ to the reduction function DR. Each bit $\beta_i$ may correspond to the occupancy status of a neighboring cuboid of a current child cuboid or a set of neighboring cuboids of a current child cuboid.

Higher (e.g., more significant) bits $\beta_i$ (e.g., $\beta_0$, $\beta_1$, etc.) may be the first bits to be unmasked. Higher (e.g., more significant) bits $\beta_i$ (e.g., $\beta_0$, $\beta_1$, etc.) may be the first bits to be unmasked, for example, during the evolution of the dynamic reduction function DR. The order of neighbor-based information put in the bits $\beta_i$ may impact the compression performance. Neighboring information may be ordered from higher priority to lower priority and put, in this order, into the bits $\beta_i$, e.g., from higher to lower weight. The priority may be, from the most important to the least important, occupancy of sets of adjacent neighboring child cuboids, then occupancy of adjacent neighboring child cuboids, then occupancy of adjacent neighboring parent cuboids, then occupancy of non-adjacent neighboring child nodes, and finally occupancy of non-adjacent neighboring parent nodes. Adjacent nodes sharing a face with the current child node may also have higher priority than adjacent nodes sharing an edge (but not sharing a face) with the current child node. Adjacent nodes sharing an edge with the current child node may have higher priority than adjacent nodes sharing only a vertex with the current child node.

Figure 6:
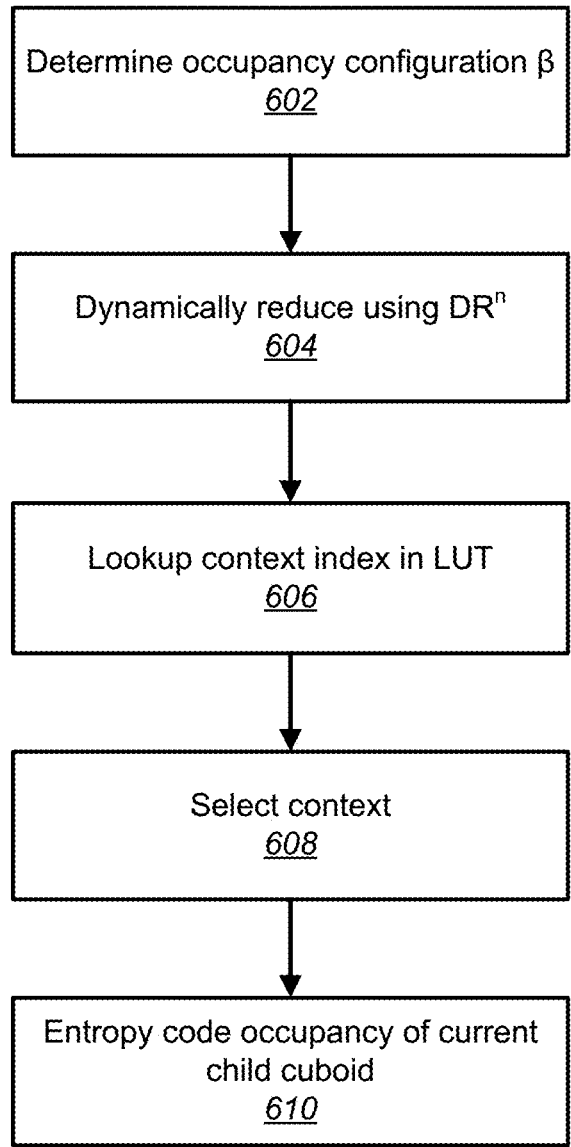
FIG. 6 shows an example method for coding occupancy of a cuboid using dynamic OBUF.

FIG. 6 shows an example method for coding occupancy of a cuboid using dynamic OBUF. More specifically, FIG. 6 shows a flowchart of an example method for coding occupancy (e.g., as indicated by a single bit) of a current child cuboid using dynamic OBUF. More specifically, FIG. 6 shows a flowchart of example method steps coding occupancy of a current child cuboid using dynamic OBUF. The example method, or one or more operations of the method, may be performed by one or more computing devices or entities. For example, all or portions of the flowchart may be implemented by a coder (e.g., encoder 114 in FIG. 1 and/or decoder 120 in FIG. 1), an example computer system 2100 in FIG. 21, and/or an example computing device 2230 in FIG. 22.

At step 602, an encoder and/or decoder may determine the occupancy configuration $\beta$ of the current child cuboid. The encoder and/or decoder may determine the occupancy configuration $\beta$ of the current child cuboid, for example, based on occupancy bits of already-coded cuboids in a neighborhood of the current child cuboid. At step 604, the encoder and/or decoder may dynamically reduce the occupancy configuration $\beta$ into a reduced occupancy configuration using $DR''$ (e.g., $\beta'=DR''(\beta)$). At step 606, the encoder and/or decoder may lookup context index $LUT[\beta']$ in the LUT of the dynamic OBUF. At step 608, the encoder and/or decoder may select the context (e.g., probability model) pointed to by the context index. At step 610, the encoder and/or decoder may entropy code (e.g., arithmetic code) the occupancy bit of the current child cuboid based on the context.

Although not shown in FIG. 6, the encoder and/or decoder may further update the reduction function $DR''$ into $DR''^{+1}$ and/or update the context index $LUT[\beta']$ based on the occupancy bit of the current child cuboid. The method of FIG. 6 may be repeated for additional or all child cuboids of parent cuboids corresponding to nodes of the occupancy tree in a scan order, such as the scan order described herein with respect to FIG. 3.

The occupancy tree is a lossless compression technique. The occupancy tree may be adapted to provide lossy compression, for example, by modifying the point cloud on the encoder side (e.g., down-sampling, removing points, moving points, etc.) but compression performance of the lossy compression may be weak. It may be a useful lossless compression technique for dense point clouds.

An approach to lossy compression for point cloud geometry may be to set the maximum depth of the occupancy tree to not reach the smallest volume size of one voxel. Instead, the maximum depth of the occupancy tree may be set to stop at a bigger volume size (e.g., N×N×N cuboids, where N>1). The geometry of the points belonging to each occupied leaf node associated with the bigger volumes may then be modeled. This approach may be particularly suited for dense and smooth point clouds that may be locally modeled by smooth functions, for example, planes or polynomials. The coding cost may become the cost of the occupancy tree plus the cost of the local model in each of the occupied leaf nodes.

A scheme for modeling the geometry of the points belonging to each occupied leaf node associated with a volume size larger than one voxel may use sets of triangles as local models. The scheme may be referred to as the "TriSoup" scheme. TriSoup is short for "Triangle Soup" because the connectivity between triangles may not be part of the models. An occupied leaf node of an occupancy tree that corresponds to a cuboid with a volume greater than one voxel may be referred to as a TriSoup node. An edge belonging to at least one cuboid corresponding to a TriSoup node may be referred to as a TriSoup edge. A TriSoup node may comprise a presence flag ($s_k$) for each TriSoup edge of its corresponding occupied cuboid. A presence flag ($s_k$) of a TriSoup edge may indicate whether a TriSoup vertex ($V_k$) is present or not on the TriSoup edge. At most one TriSoup vertex ($V_k$) may be present on a TriSoup edge. For each vertex ($V_k$) present on a TriSoup edge of an occupied cuboid, the TriSoup node corresponding to the occupied cuboid may further comprise a position ($p_k$) of the vertex ($V_k$) along the TriSoup edge.

In addition to the occupancy words of an occupancy tree, an encoder may entropy encode the TriSoup vertex presence flags and positions of each TriSoup edge belonging to TriSoup nodes of the occupancy tree. A decoder may similarly entropy decode the TriSoup vertex presence flags and positions of each TriSoup edge belonging to a TriSoup node of the occupancy tree, in addition to the occupancy words of the occupancy tree.

Figure 7:
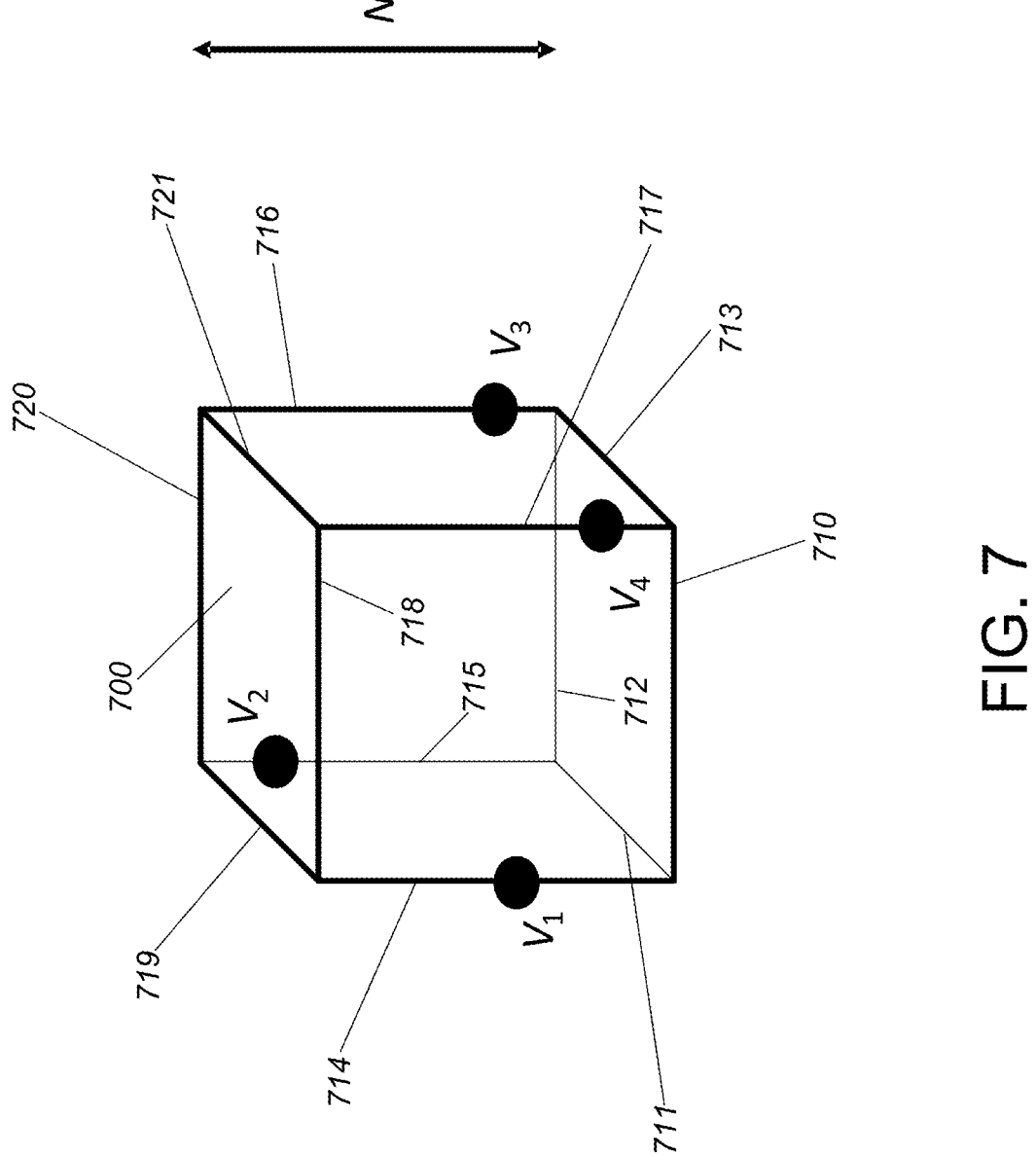
FIG. 7 shows an example of an occupied cuboid that corresponds to a TriSoup node of an occupancy tree.

FIG. 7 shows an example of an occupied cuboid 700 that corresponds to a TriSoup node of an occupancy tree. Cuboid 700 may be of size NxNxN (where N>1). Occupied cuboid 700 may comprise TriSoup edges 710-721. The TriSoup node, corresponding to occupied cuboid 700, may comprise a presence flag ($s_k$) for each TriSoup edge of TriSoup edges 710-721. The presence flag of TriSoup edge 714 may indicate that a TriSoup vertex $V_1$ is present on TriSoup edge 714. The presence flag of TriSoup edge 715 may indicate that a TriSoup vertex $V_2$ is present on TriSoup edge 715. The presence flag of TriSoup edge 716 may indicate that a TriSoup vertex $V_3$ is present on TriSoup edge 716. The presence flag of TriSoup edge 717 may indicate that a TriSoup vertex $V_4$ is present on TriSoup edge 717. The presence flags of the remaining TriSoup edges may each indicate that a TriSoup vertex is not present on their corresponding TriSoup edge. The TriSoup node, corresponding to occupied cuboid 700, may further comprise a position for each TriSoup vertex present along one of its TriSoup edges 710-721. More specifically, the TriSoup node, corresponding to occupied cuboid 700, may further comprise a position $p_1$ for TriSoup vertex $V_1$, a position $p_2$ for TriSoup vertex $V_2$, a position $p_3$ for TriSoup vertex $V_3$, and a position $p_4$ for TriSoup vertex $V_4$.

Figure 8A:
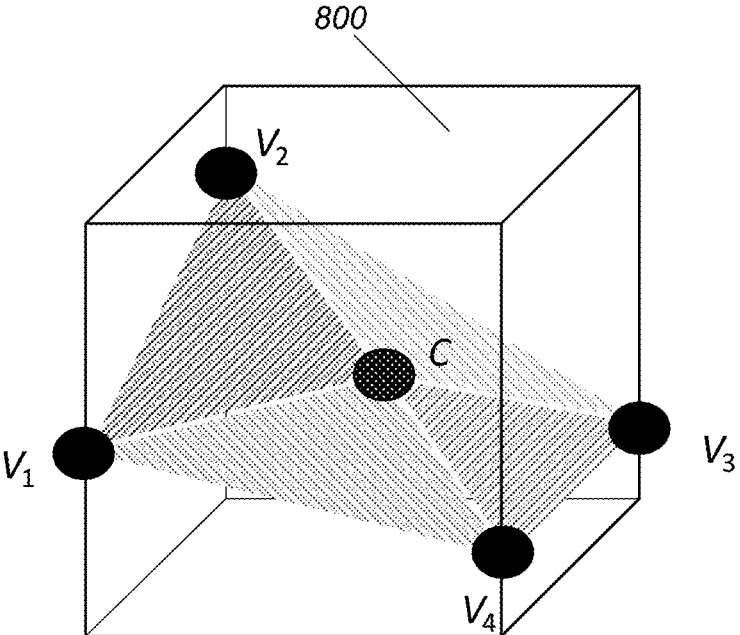
FIG. 8A shows an example cuboid corresponding to a TriSoup node.

FIG. 8A shows an example cuboid corresponding to a TriSoup node. A cuboid 800 may correspond to a TriSoup node with a number K of TriSoup vertices $V_k$. Within cuboid 800, TriSoup triangles may be constructed from the TriSoup vertices $V_k$. TriSoup triangles may be constructed from the TriSoup vertices $V_k$, for example, if at least three (K≥3) TriSoup vertices are present on the TriSoup edges of cuboid 800. In the example of FIG. 8A, 4 TriSoup vertices are present and TriSoup triangles are constructed. The TriSoup triangles may be constructed around the centroid vertex C. The centroid vertex C may be defined as the mean of the TriSoup vertices $V_k$. A dominant direction may be determined, vertices $V_k$ may be ordered by turning around this direction, and the following K TriSoup triangles may be constructed: $V_1V_2C$, $V_2V_3C$, . . . , $V_KV_1C$. The dominant direction may be chosen among the three directions respectively parallel to the axes of the 3D space to increase or maximize the 2D surface of the triangles, for example, if the triangles are projected along the dominant direction. The dominant direction may be somewhat perpendicular to a local surface defined by the points of the point cloud belonging to the TriSoup node.

Figure 8B:
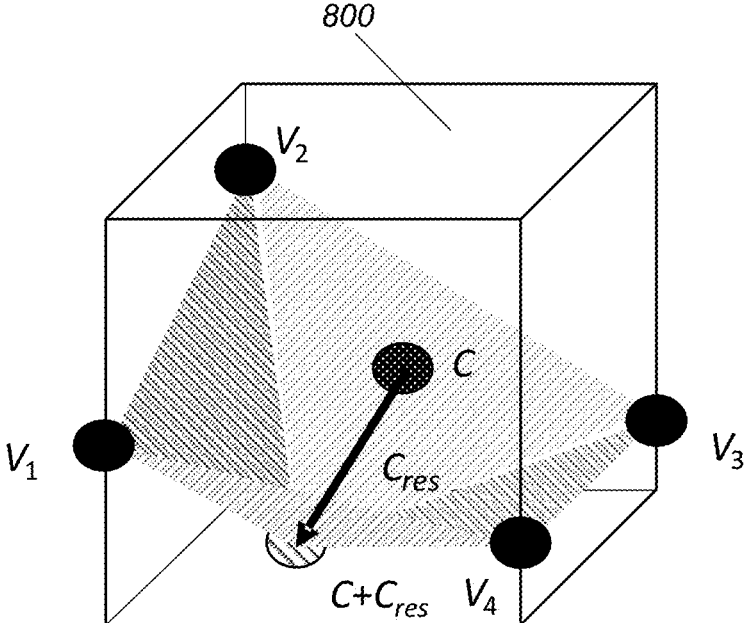
FIG. 8B shows an example refinement to a TriSoup model.

FIG. 8B shows an example refinement to the TriSoup model. The TriSoup model may be refined by coding a centroid residual value $C_{res}$ may be coded into the bitstream. A centroid residual value $C_{res}$ may be coded into the bitstream, for example, to use $C+C_{res}$ instead of C as a pivoting vertex for the triangles. By using $C+C_{res}$ as the pivoting vertex for the triangles, the vertex $C+C_{res}$ may be closer to the points of the point cloud than the centroid C, the reconstruction error may be lowered, thereby leading to lower distortion at the cost of a small increase in bitrate needed for coding $C_{res}$.

Figure 9:
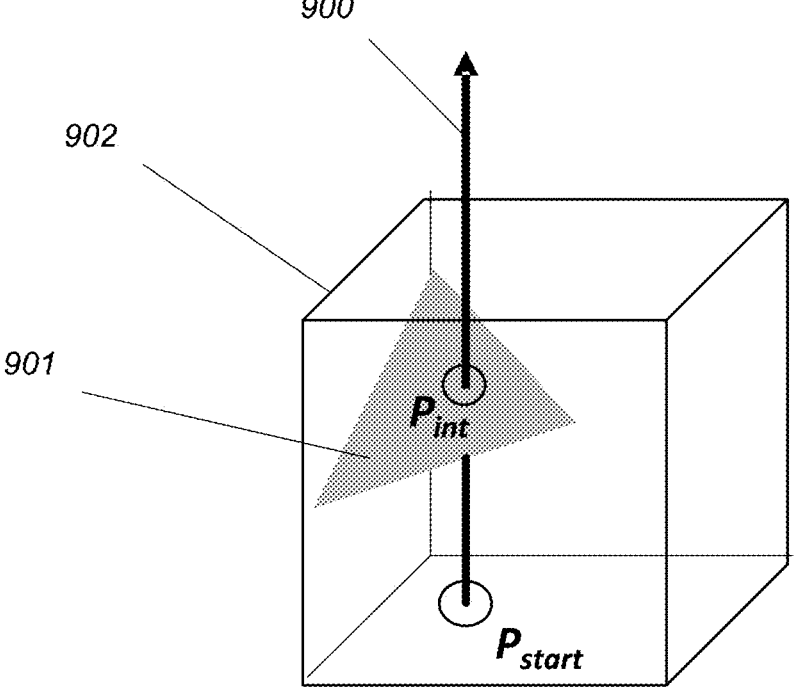
FIG. 9 shows an example of voxelization.

FIG. 9 shows an example of voxelization. Voxelization may refer to reconstruction of a decoded point cloud from the set of TriSoup triangles. Voxelization may be performed by ray tracing for each triangle individually. Voxelization may be performed by ray tracing for each triangle individually, for example, before removing duplicated points between voxelized triangles. As shown in FIG. 9, rays 900 may be launched parallel to one of the three axes of the 3D space. Rays 900 may be launched starting from integer coordinates $P_{start}$. The intersection $P_{int}$ (if any) of the rays 900 with a TriSoup triangle 901 belonging to a cuboid 902 corresponding to a TriSoup node may be rounded to obtain a decoded point. This intersection $P_{int}$ may be found, for example, using the Möller-Trumbore algorithm.

A presence flag ($s_k$) and, if the presence flag ($s_k$) indicates the presence of a vertex, a position ($p_k$) of a current TriSoup edge may be entropy coded. The presence flag ($s_k$) and position ($p_k$) may be individually or collectively referred to as vertex information. A presence flag ($s_k$) and, if the presence flag ($s_k$) indicates the presence of a vertex, a position ($p_k$) of a current TriSoup edge may be entropy coded, for example, based on already-coded presence flags and positions of TriSoup edges that neighbor the current TriSoup edge. A presence flag ($s_k$) and, if the presence flag ($s_k$) indicates the presence of a vertex, a position ($p_k$) of a current TriSoup edge may be additionally or alternatively entropy coded. The presence flag ($s_k$) and the position ($p_k$) of a current TriSoup edge may be additionally or alternatively entropy coded, for example, based on occupancies of cuboids that neighbor the current TriSoup edge. Similar to the entropy coding of the occupancy bits of the occupancy tree, a configuration $\beta_{TS}$ for a neighborhood (also referred to as a neighborhood configuration $\beta_{TS}$) of a current TriSoup edge may be obtained and dynamically reduced into a reduced configuration $\beta_{TS}'=DR''(\beta_{TS})$. The configuration $\beta_{TS}$ for a neighborhood of a current TriSoup edge may be obtained and dynamically reduced into a reduced configuration $\beta_{TS}'=DR''(\beta_{TS})$, for example, by using a dynamic OBUF scheme for TriSoup. A context index LUT[$\beta_{TS}'$] may be obtained from the OBUF LUT. At least a part of the vertex information of the current TriSoup edge may be entropy coded using the context (e.g., probability model) pointed to by the context index.

The TriSoup vertex position ($p_k$) (if present) along its TriSoup edge may be binarized. The TriSoup vertex position ($p_k$) (if present) along its TriSoup edge may be binarized, for example, to use a binary entropy coder to entropy code at least part of the vertex information of the current TriSoup edge. A number (e.g., quantity) of bits $N_b$ may be set for the quantization of the TriSoup vertex position ($p_k$) along the TriSoup edge of length N. The TriSoup edge of length N may be uniformly divided into $2^{Nb}$ quantization intervals. By doing so, the TriSoup vertex position ($p_k$) may be represented by $N_b$ bits ($p_k^j$, j=1, . . . , $N_b$) that may be individually coded by the dynamic OBUF scheme as well as the bit corresponding to the presence flag ($s_k$). The neighborhood configuration $\beta_{TS}$, the OBUF reduction function $DR''$, and thus the context index may depend on the nature of the coded bit (e.g., presence flag ($s_k$), highest position bit ($P_k^1$), second highest position bit ($P_k^2$), etc.). There may be several dynamic OBUF schemes, each dedicated to a specific bit of information (e.g., presence flag ($s_k$) or position bit ($p_k^j$)) of the vertex information.

Figure 10A:
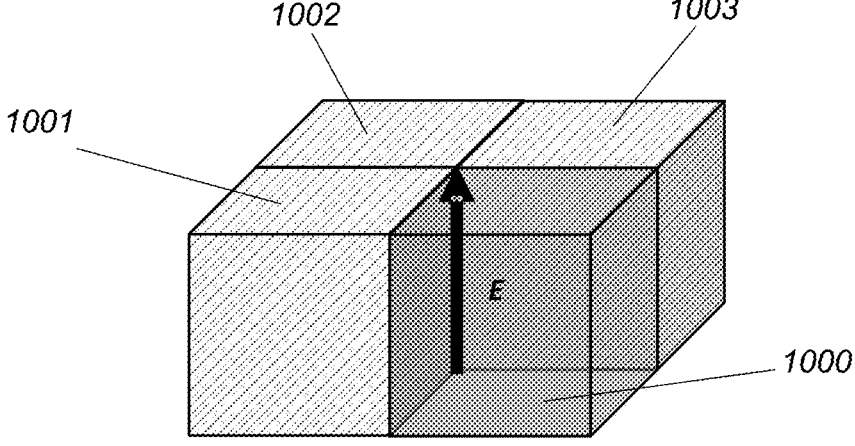
FIG. 10A and FIG. 10B show cuboids with volumes that intersect a current TriSoup edge being entropy coded.
Figure 10B:
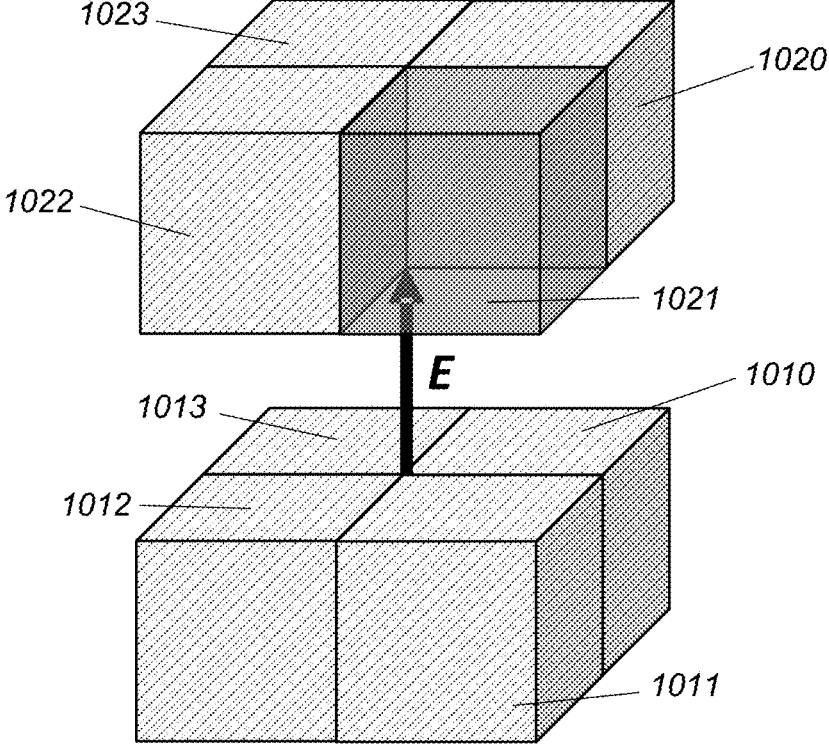

FIG. 10A and FIG. 10B show 12 cuboids 1000-1003, 1010-1013, and 1020-1023 with volumes that intersect a current TriSoup edge E being entropy coded. Current TriSoup edge E is an edge of cuboids 1000-1003. The start point of current TriSoup edge E intersects cuboids 1010-1013. The end point of current TriSoup edge E intersects cuboids 1020-1023. The occupancy bits of one or more of the 12 cuboids 1000-1003, 1010-1013, and 1020-1023 may be used to determine the neighborhood configuration $\beta_{TS}$ for current TriSoup edge E.

TriSoup edges may be oriented from a start point to an end point following the orientation of one of the three axes of the 3D space they are parallel to. A global ordering of the TriSoup edges may be defined as the lexicographic order over the couple (e.g., start point, end point). Vertex information related to the TriSoup edges may be coded following the TriSoup edge ordering. A causal neighborhood of a current TriSoup edge may be obtained from the neighboring already-coded TriSoup edges of the current TriSoup edge.

Figure 11C:
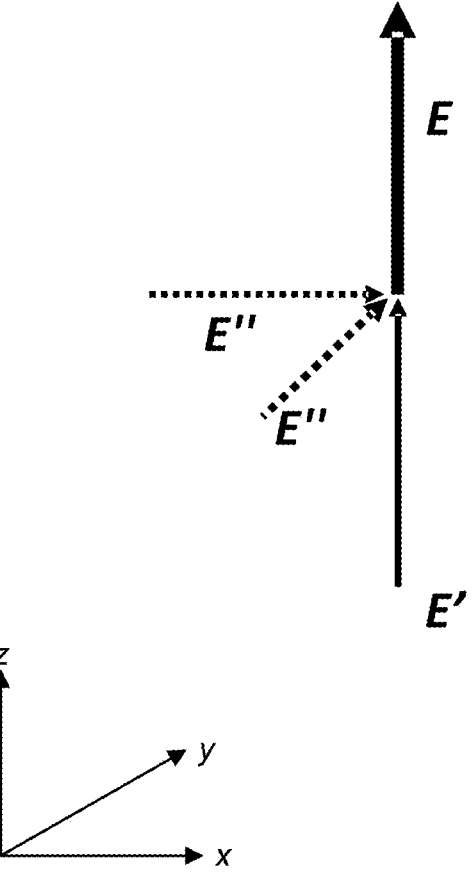

FIG. 11A, FIG. 11B, and FIG. 11C show TriSoup edges (E' and E") that may be used to entropy code a current edge E. In some instances, at most five TriSoup edges (E' and E") may be used to entropy code a current edge E. The five TriSoup edges may include, the edge E' parallel to the current Tri Soup edge E and having an end point equal to the start point of the current TriSoup edge E, and the four edges E" perpendicular to the current TriSoup edge E and having a start or end point equal to the start point of the current TriSoup edge E.

Depending on the direction of current TriSoup edge E, either two (FIG. 11C for direction z), three (FIG. 11B for direction y), or four (FIG. 11A for direction x) of the four perpendicular TriSoup edges may have been already coded and their vertex information may be used to construct the neighborhood configuration $\beta_{TS}$ for current TriSoup edge E. The TriSoup edge E' may have already been coded for each direction of the current TriSoup edge E and its vertex information may be used to construct the neighborhood configuration $\beta_{TS}$ for current TriSoup edge E independent of its direction.

As described herein, the neighborhood configuration $\beta_{TS}$ for a current TriSoup edge E may be obtained from one or more occupancy bits of cuboids and from the vertex information of neighboring already-coded TriSoup edges. The neighborhood configuration $\beta_{TS}$ for a current TriSoup edge E may be obtained from one or more of the 12 occupancy bits of the 12 cuboids shown in FIG. 10A and FIG. 10B and from the vertex information of the at most five neighboring already-coded TriSoup edges (E' and E") shown in FIGS. 11A, 11B, and 11C.

As described herein with respect to FIGS. 11A, 11B, and 11C, the vertex information of at most five TriSoup edges may be used to entropy code a current TriSoup edge E. More particularly, as described herein with respect to FIGS. 11A, 11B, and 11C, the vertex information of at most five TriSoup edges may be used to determine the neighborhood configuration $\beta_{TS}$ of the current TriSoup edge E. The neighborhood configuration $\beta_{TS}$ may be dynamically reduced into a reduced configuration $\beta_{TS}'=DR''(\beta_{TS})$. The neighborhood configuration $\beta_{TS}$ may be dynamically reduced into a reduced configuration $\beta_{TS}'=DR''(\beta_{TS})$, for example, by using a dynamic OBUF scheme as described herein. A context index LUT[$\beta_{TS}'$] may be obtained from the OBUF LUT and at least a part of the vertex information of the current TriSoup edge E may be entropy coded using the context (e.g., probability model) pointed to by the context index.

Using the vertex information of the at most five TriSoup edges to entropy code the current TriSoup edge E may result in a weak correlation between the neighborhood configuration $\beta_{TS}$ and the vertex information of current TriSoup edge E. The dynamic OBUF scheme may provide a context index for entropy coding the current TriSoup edge E with coding probabilities that are weakly correlated with the vertex information of the current TriSoup edge E. Because of this weak correlation, the vertex information of the current TriSoup edge E may not be effectively compressed.

The disclosures provided herein improve the correlation between the neighborhood configuration $\beta_{TS}$ of a current TriSoup edge E and the vertex information of the current TriSoup edge E. The improved correlation may allow the vertex information of the current TriSoup edge E to be more effectively compressed using entropy coding. The improved compression using entropy coding may lead to smaller storage requirement, faster and more efficient transmission of point cloud data, and faster and more efficient processing of the point cloud data. This can result in a better experience in and wider adoption of volumetric visual data applications such as AR, VR, MR, and many others, as well as advancement in any hardware implementation of such technologies. As described herein, an encoder and/or decoder may determine one or more symbols of a neighborhood configuration $\beta_{TS}$ of the current TriSoup edge E. The encoder and/or decoder may determine one or more symbols of a neighborhood configuration $\beta_{TS}$ of the current TriSoup edge E, for example, based on at least one TriSoup edge that, unlike the at most five TriSoup edges shown in FIG. 11A, FIGS. 11B, and 11C, does not intersect a start point of the current TriSoup edge E. The vertex information of this at least one TriSoup edge may be used to determine (e.g., in conjunction with one or more of the at least five TriSoup edges shown in FIG. 11A, FIGS. 11B, and 11C) one or more symbols of the neighborhood configuration $\beta_{TS}$ with the improved correlation. The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$ with the improved correlation. The encoder and/or decoder may select the context for coding the vertex information of the current TriSoup edge E, for example, based on a reduced configuration $\beta_{TS}'=DR''(\beta_{TS})$ representing a subset of the symbols of the neighborhood configuration $\beta_{TS}$. The encoder and/or decoder may select the context based on an OBUF LUT that maps the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E. The encoder and/or decoder may entropy code (e.g., arithmetic code) the vertex information of the current TriSoup edge E, for example, based on the context.

FIG. 12A, FIG. 12B, and FIG. 12C show neighboring already-coded TriSoup edges that neighbor and do not intersect a start point of a current TriSoup edge E. The current TriSoup edge E may be a TriSoup edge being entropy coded. The neighboring already-coded TriSoup edges shown in FIG. 12A, FIG. 12B, and FIG. 12C do not intersect a start point of a current TriSoup edge E being entropy coded, unlike the at most five TriSoup edges shown in FIG. 11A, FIGS. 11B, and 11C. More particularly, FIG. 12A, FIG. 12B, and FIG. 12C show neighboring already-coded TriSoup edges $E_{par}$ that are parallel to the current TriSoup edge E and belong to a same TriSoup node as the current TriSoup edge E.

FIG. 12A shows already-coded parallel edges $E_{par}$ that are available for coding a current TriSoup edge E. The already-coded parallel edges $E_{par}$ may be available for coding a current TriSoup edge E, for example, based on the current TriSoup edge E being parallel to the x direction. FIG. 12B shows already-coded parallel edges $E_{par}$ that are available for coding a current TriSoup edge E. The already-coded parallel edges $E_{par}$ may be available for coding a current TriSoup edge E, for example, based on the current TriSoup edge E being parallel to the y direction. FIG. 12C shows already-coded parallel edges $E_{par}$ that are available for coding a current TriSoup edge E. The already-coded parallel edges $E_{par}$ may be available for coding a current TriSoup edge E, for example, based on the current TriSoup edge E being parallel to the z direction. These parallel edges $E_{par}$ may already be coded according to the lexicographic order, as described herein, that globally orders the set of TriSoup edges.

An encoder and/or decoder may determine one or more symbols of a neighborhood configuration $\beta_{TS}$ of a current TriSoup edge E. The encoder and/or decoder may determine one or more symbols of a neighborhood configuration $\beta_{TS}$ of a current TriSoup edge E, for example, based on one or more of the already-coded four parallel edges $E_{par}$ shown in FIG. 12A, FIG. 12B, and FIG. 12C that may be available for coding the current TriSoup edge E. The specific set of already-coded four parallel edges $E_{par}$ shown in FIG. 12A, FIG. 12B, and FIG. 12C that may be available for coding the current TriSoup edge E may be determined, for example, based on the direction to which the current TriSoup edge E is parallel as described herein. The vertex information of the one or more of the already-coded four parallel edges $E_{par}$ may be used to determine (e.g., in conjunction with one or more of the at least five TriSoup edges shown in FIG. 11A, FIGS. 11B, and 11C) one or more symbols of a neighborhood configuration $\beta_{TS}$ of the current TriSoup edge E. The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$. The encoder and/or decoder may select the context for coding the vertex information of the current TriSoup edge E. The encoder and/or decoder may select the context for coding the vertex information of the current TriSoup edge E, for example, based on a reduced configuration $\beta_{TS}'=DR''(\beta_{TS})$ representing a subset of the symbols of the neighborhood configuration $\beta_{TS}$. The encoder and/or decoder may select the context, for example, based on an OBUF LUT that maps the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E, for example, based on the context.

FIG. 13A, FIG. 13B, and FIG. 13C show already-coded TriSoup edges that neighbor and do not intersect a start point of a current TriSoup edge. The neighboring already-coded TriSoup edges shown in FIG. 13A, FIG. 13B, and FIG. 13C do not intersect a start point of a current TriSoup edge E being entropy coded, unlike the at most five TriSoup edges shown in FIG. 11A, FIGS. 11B, and 11C. More particularly, FIG. 13A, FIG. 13B, and FIG. 13C show neighboring already-coded TriSoup edges $E_{perp}$ that may be perpendicular to the current TriSoup edge E and intersect the end point of the current TriSoup edge E.

FIG. 13A shows that no already-coded perpendicular edges $E_{perp}$ may be available for coding a current TriSoup edge E based on the current TriSoup edge E being parallel to the x axis. FIG. 13B shows that one already-coded perpendicular edge $E_{perp}$ may be available for coding a current TriSoup edge E based on the current TriSoup edge E being parallel to the y axis. FIG. 13C shows that two already-coded perpendicular edges $E_{perp}$ may be available for coding a current TriSoup edge E based on the current TriSoup edge E being parallel to the z axis. These perpendicular edges $E_{perp}$ may already be coded according to the lexicographic order, as described here, that globally orders the set of TriSoup edges.

An encoder and/or decoder may determine one or more symbols of a neighborhood configuration $\beta_{TS}$ of a current TriSoup edge E. An encoder and/or decoder may determine one or more symbols of a neighborhood configuration $\beta_{TS}$ of a current TriSoup edge E, for example, based on one or more of the already-coded perpendicular edges $E_{perp}$ shown in FIG. 13A, FIG. 13B, and FIG. 13C that are available for coding the current TriSoup edge E. The specific set of already-coded perpendicular edges $E_{perp}$ shown in FIG. 13A, FIG. 13B, and FIG. 13C that may be available for coding the current TriSoup edge E may be determined, for example, based on the direction to which the current TriSoup edge E is parallel as described herein. The vertex information of the one or more of the already-coded perpendicular edges $E_{perp}$ may be used to determine (e.g., in conjunction with one or more of the at least five TriSoup edges shown in FIG. 11A, FIGS. 11B, and 11C and/or in conjunction with one or more of the already-coded four parallel edges $E_{par}$ shown in FIG. 12A, FIG. 12B, and FIG. 12C) one or more symbols of a neighborhood configuration $\beta_{TS}$ of the current TriSoup edge E. The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$. The encoder and/or decoder may select the context for coding the vertex information of the current TriSoup edge E. The encoder and/or decoder may select the context for coding the vertex information of the current TriSoup edge E, for example, based on a reduced configuration $\beta_{TS}'=DR''$ $(\beta_{TS})$ representing a subset of the symbols of the neighborhood configuration $\beta_{TS}$. The encoder and/or decoder may select the context based on an OBUF LUT. The OBUF LUT may map the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E based on the context.

FIG. 14A, FIG. 14B, and FIG. 14C show neighboring already coded edges of a current TriSoup edge E. The neighboring already coded edges may be taken from a spatial topology, of a current TriSoup edge E. The neighboring already coded edges may be taken from a spatial topology of 18 edges (e.g., labeled from 0 to 17). The current TriSoup edge E may be parallel: to the x direction (FIG. 14A), to the y direction (FIG. 14B), or to the z direction (FIG. 14C). Edge 0 may correspond to the unique edge (E' in FIG. 11) parallel to the current TriSoup edge E and having its end point equal to (e.g., coinciding with) the start point of the current TriSoup edge E. Edges 1, 2, 3, 4 may correspond to the at most four edges (E" in FIG. 11A, FIGS. 11B, and 11C) perpendicular to the current TriSoup edge E and having a start or end point equal to (e.g., coinciding with) the start point of the current TriSoup edge E. Edges 14, 15, 16, 17 may be edges ($E_{par}$ in FIG. 12A, FIG. 12B, and FIG. 12C) that are parallel to the current TriSoup edge E and belong to a same TriSoup node as the current TriSoup edge E. Edges 9, 10 may be edges ($E_{perp}$ in FIG. 13A, FIG. 13B, and FIG. 13C) that are perpendicular to the current TriSoup edge E and intersect the end point of the current TriSoup edge E. Edges 1, 2, 3, 4, 5, 6, 7, 8 may belong to a same TriSoup node as the current TriSoup edge E and may belong to the plane: perpendicular to the current TriSoup edge E, and comprising the start point of the current TriSoup edge E. Edges 9, 10, 11, 12, 13 may belong to a same TriSoup node as the current TriSoup edge E and belong to the plane: perpendicular to the current TriSoup edge E, and comprising the end point of the current TriSoup edge E.

An encoder and/or decoder may determine one or more symbols of a neighborhood configuration $\beta_{TS}$ of a current TriSoup edge E. encoder and/or decoder may determine one or more symbols of a neighborhood configuration $\beta_{TS}$ of a current TriSoup edge E, for example, based on one or more of the already-coded edges 0 to 17 shown in FIG. 14A, FIG. 14B, and FIG. 14C that are available for coding the current TriSoup edge E. The specific set of the already-coded edges 0 to 17 shown in FIG. 14A, FIG. 14B, and FIG. 14C that may be available for coding the current TriSoup edge E may be determined, for example, based on the direction to which the current TriSoup edge E is parallel. The vertex information of the one or more of the already-coded edges 0 to 17 may be used to determine one or more symbols of a neighborhood configuration $\beta_{TS}$ of the current TriSoup edge E. The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$. The encoder and/or decoder may select the context for coding the vertex information of the current TriSoup edge E. The encoder and/or decoder may select the context for coding the vertex information of the current TriSoup edge E, for example, based on a reduced configuration $\beta_{TS}'=DR''(\beta_{TS})$ representing a subset of the symbols of the neighborhood configuration $\beta_{TS}$. The encoder and/or decoder may select the context. The encoder and/or decoder may select the context, for example, based on an OBUF LUT that maps the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E. The encoder and/or decoder may entropy code (e.g., arithmetic code) the vertex information of the current TriSoup edge E, for example, based on the context.

The spatial topology of 18 edges shown in FIG. 14A, FIG. 14B, and FIG. 14C may include sub-spatial topologies of edges. Each edge of the sub-spatial topologies of edges may be available (e.g., already coded) for coding a current TriSoup edge E independent of a direction to which the current TriSoup edge E is parallel. FIG. 15A, FIG. 15B, and FIG. 15C show an example of a sub-spatial topology of TriSoup edges. The sub-spatial topology of TriSoup edges may be, for example, an 18-edge spatial topology as shown in FIG. 14A, FIG. 14B, and FIG. 14C. The sub-spatial topology of edges may comprise the 11 edges 0, 1, 2, 5, 6, 7, 8, 14, 15, 16, 17. FIG. 15A, FIG. 15B, and FIG. 15C show that, for each of the three possible directions of the current TriSoup edge E, each of the 11 edges of the sub-spatial topology of edges may be available for coding the current TriSoup edge E. FIG. 15A shows that each of the 11 edges of the sub-spatial topology of edges may be available for coding the current TriSoup edge E, for example, if current TriSoup edge E is parallel to the x axis. FIG. 15B shows that each of the 11 edges of the sub-spatial topology of edges may be available for coding the current TriSoup edge E parallel to the y axis. FIG. 15C shows that each of the 11 edges of the sub-spatial topology of edges may be available for coding the current TriSoup edge E parallel to the z axis.

A different configuration of the sub-spatial topology may be used for each direction of current TriSoup edge E. The different configurations may comprise different rotated and/ or mirrored configurations of the sub-spatial topology of edges. The sub-spatial topology of edges in FIG. 15A may be rotated by 90 degrees in two different directions (e.g., rotated around the y axis and rotated around the z axis) relative to the sub-spatial topology of edges in FIG. 15C. The sub-spatial topology of edges in FIG. 15A may be rotated by 90 degrees (e.g., around the z axis) and mirrored (e.g., over the x-z plane) relative to the sub-spatial topology of edges in FIG. 15B.

An encoder and/or decoder may determine one or more symbols of a neighborhood configuration $\beta_{TS}$ of a current TriSoup edge E. An encoder and/or decoder may determine one or more symbols of a neighborhood configuration $\beta_{TS}$ of a current TriSoup edge E, for example, based on edges only belonging to the sub-spatial topology of edges shown in FIG. 15A, FIG. 15B, and FIG. 15C that are available for coding the current TriSoup edge E independent of its direction (e.g., independent of a direction to which the current TriSoup edge E is parallel). The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$. The encoder and/or decoder may select the context for coding the vertex information of the current TriSoup edge E. The encoder and/or decoder may select the context for coding the vertex information of the current TriSoup edge E, for example, based on a reduced configuration $\beta_{TS}'=DR''(\beta_{TS})$. The reduced configuration $\beta_{TS}'=DR''(\beta_{TS})$ may represent a subset of the symbols of the neighborhood configuration $\beta_{TS}$. The encoder and/or decoder may select the context based on an OBUF LUT that maps the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E. The encoder and/or decoder may entropy code (e.g., arithmetic code) the vertex information of the current TriSoup edge E, for example, based on the context.

A spatial topology of edges may be referred to as a direction-independent spatial-topology of edges. Each edge of the spatial topology of edges may be available (e.g., already coded) for coding a current TriSoup edge E independent of a direction of the current TriSoup edge E.

Dilution of the dynamic OBUF statistics by having a unique set of statistics for all three directions of a current TriSoup edge E may be reduced or avoided. Dilution of the dynamic OBUF statistics by having a unique set of statistics for all three directions of a current TriSoup edge E may be reduced or avoided, for example, by determining one or more symbols of a neighborhood configuration $\beta_{TS}$ of a current TriSoup edge E based on edges only belonging to a direction-independent spatial-topology of edges. The one or more symbols of a neighborhood configuration $\beta_{TS}$ of a current TriSoup edge E may be determined based on edges only belonging to a direction-independent spatial-topology of edges, for example, like the sub-spatial topology of edges shown in FIG. 15A, FIG. 15B, and FIG. 15C. This may lead to faster convergence of the OBUF LUT of context indices, and result in more efficient compression of the vertex information of the current TriSoup edge E.

An encoder and/or decoder implementation may determine one or more symbols of a neighborhood configuration $\beta_{TS}$ of a current TriSoup edge E based on edges only belonging to a direction-independent spatial-topology of edges. In this implementation, the encoder and/or decoder may split the neighborhood configuration $\beta_{TS}$ into at least three series of bits $$\beta_{TS}=(\beta_{ind},\text{dir},\beta_{dep})$$

$\beta_{ind}$ is the one or more symbols of the neighborhood configuration $\beta_{TS}$ determined based on edges only belonging to a direction-independent spatial-topology of edges, dir is the direction of the current edge, and $\beta_{dep}$ is one or more symbols of the neighborhood configuration $\beta_{TS}$ determined based on at least one edge that is not available to code the current TriSoup edge E independent of a direction of the current TriSoup edge E. The one or more symbols $\beta_{ind}$ may be determined, for example, based on edges only belonging to the sub-spatial topology of edges shown in FIG. 15A, FIG. 15B, and FIG. 15C. $\beta_{dep}$ may be determined, for example, based on edges belonging to the spatial topology of edges shown in FIG. 14A, FIG. 14B, and FIG. 14C that do not belong to the sub-spatial topology of edges shown in FIG. 15A, FIG. 15B, and FIG. 15C. The direction dir may be made of two bits, for example: 00 for x, 01 for y, 10 for z, and 11 may be unused. The encoder and/or decoder may start coding information by dynamic OBUF. The encoder and/or decoder may start coding information by dynamic OBUF, for example, by using the leftmost bits $\beta_{ind}$ of the neighborhood configuration $\beta_{TS}$ that shares the same statistics independent of the direction of the current TriSoup edge E. This may help dynamic OBUF converge faster in its early phase. More bits of the neighborhood configuration $\beta_{TS}$ may be unmasked. More bits of the neighborhood configuration $\beta_{TS}$ may be unmasked, for example, during the evolution of the coding. The statistics may be distributed, for example, if the two bits of dir are unmasked, through the OBUF tree, among the three directions of the current TriSoup edge E to take into account the direction-dependent topology of the remaining neighborhood that has been used to construct $\beta_{dep}$.

The advantage of the direction-independent spatial-topology of edges may be realized, for example, if the geometry of the point cloud is spatially isotropic at the scale of the spatial-topology. Sharing statistics among directions may not be desirable because the statistics may not fundamentally depend on the direction. This condition may be fulfilled because the local (e.g., at the scale of the size of a TriSoup node) geometry of a point cloud may be generally isotropic for reasonable TriSoup node sizes.

Figure 16B:
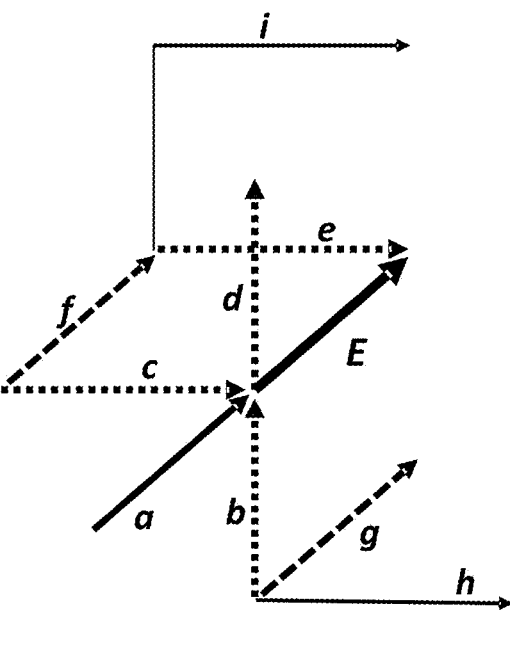
Figure 16C:
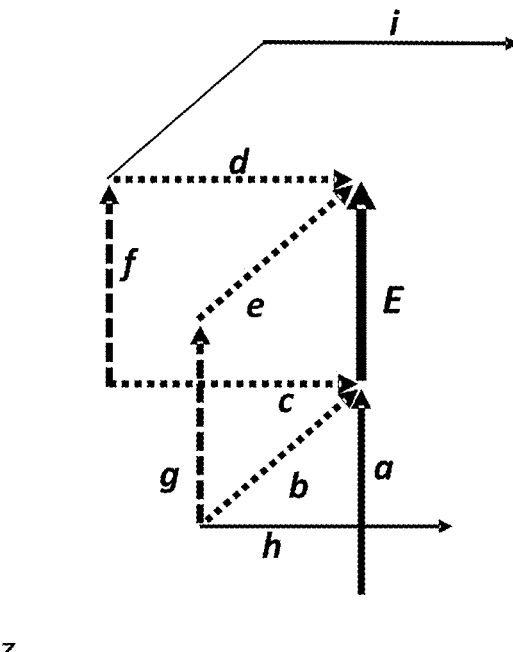

FIG. 16A, FIG. 16B, and FIG. 16C show neighboring already coded edges. The neighboring already coded edges may be taken from a spatial topology of 9 edges of a current TriSoup edge E. The 9 edges of the spatial topology may be labeled a to i. The current TriSoup edge E may be parallel: to the x direction (FIG. 16A), to the y direction (FIG. 16B), or to the z direction (FIG. 16C). The spatial topology of 9 edges shown in FIG. 16A, FIG. 16B, and FIG. 16C may be used as an alternative to the spatial topology of 18 edges shown in FIG. 14A, FIG. 14B, and FIG. 14C. By being smaller than the spatial topology of 18 edges shown in FIG. 14A, FIG. 14B, and FIG. 14C, the spatial topology of 9 edges shown in FIG. 16A, FIG. 16B, and FIG. 16C may be easier to compute but offer less correlations and thus worse compression performance.

An encoder and/or decoder may determine one or more symbols of a neighborhood configuration $\beta_{TS}$ of a current TriSoup edge E. An encoder and/or decoder may determine one or more symbols of a neighborhood configuration $\beta_{TS}$ of a current TriSoup edge E, for example, based on one or more of the already-coded edges a to i shown in FIG. 16A, FIG. 16B, and FIG. 16C that may be available for coding the current TriSoup edge E. The specific set of the already-coded edges a to i shown in FIG. 16A, FIG. 16B, and FIG. 16C that may be available for coding the current TriSoup edge E may be determined. The specific set of the already-coded edges a to i shown in FIG. 16A, FIG. 16B, and FIG. 16C that may be available for coding the current TriSoup edge E may be determined, for example, based on the direction to which the current TriSoup edge E is parallel. The vertex information of the one or more of the already-coded edges a to i may be used to determine one or more symbols of a neighborhood configuration $\beta_{TS}$ of the current TriSoup edge E. The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$. The encoder and/or decoder may select the context for coding the vertex information of the current TriSoup edge E. The encoder and/or decoder may select the context for coding the vertex information of the current TriSoup edge E, for example, based on a reduced configuration $\beta_{TS}'=DR''(\beta_{TS})$ representing a subset of the symbols of the neighborhood configuration $\beta_{TS}$. The encoder and/or decoder may select the context based on an OBUF LUT that maps the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E based on the context.

The spatial topology of 9 edges shown in FIG. 16A, FIG. 16B, and FIG. 16C may include sub-spatial topologies of edges. Each edge of the sub-spatial topologies of edges may be available (e.g., already coded) for coding a current TriSoup edge E independent of a direction to which the current TriSoup edge E is parallel. FIG. 17A, FIG. 17B, and FIG. 17C show an example of a sub-spatial topology of TriSoup edges. The sub-spatial topology of TriSoup edges may comprise 5 edges a, b, c, f, g of the 9-edge spatial topology shown in FIG. 16A, FIG. 16B, and FIG. 16C. FIG. 17A, FIG. 17B, and FIG. 17C show that, for each of the three possible directions of the current TriSoup edge E, each of the 5 edges of the sub-spatial topology of edges may be available for coding the current TriSoup edge E. FIG. 17A shows that each of the 5 edges of the sub-spatial topology of edges may be available for coding the current TriSoup edge E, for example, if current TriSoup edge E is parallel to the x axis. FIG. 17B shows that each of the 5 edges of the sub-spatial topology of edges may be available for coding the current TriSoup edge E parallel to the y axis. FIG. 17C shows that each of the 5 edges of the sub-spatial topology of edges may be available for coding the current TriSoup edge E parallel to the z axis.

An encoder and/or decoder may determine one or more symbols of a neighborhood configuration $\beta_{TS}$ of a current TriSoup edge E. An encoder and/or decoder may determine one or more symbols of a neighborhood configuration $\beta_{TS}$ of a current TriSoup edge E, for example, based on edges only belonging to the sub-spatial topology of edges shown in FIG. 17A, FIG. 17B, and FIG. 17C that may be available for coding the current TriSoup edge E independent of its direction (e.g., independent of a direction to which the current TriSoup edge E is parallel). The encoder and/or decoder may select a context (e.g., probability model) for coding the vertex information of the current TriSoup edge E. The encoder and/or decoder may select a context (e.g., probability model) for coding the vertex information of the current TriSoup edge E, for example, based on the neighborhood configuration $\beta_{TS}$. The encoder and/or decoder may select the context for coding the vertex information of the current TriSoup edge E. The encoder and/or decoder may select the context for coding the vertex information of the current TriSoup edge E, for example, based on a reduced configuration $\beta_{TS}'=DR''(\beta_{TS})$ representing a subset of the symbols of the neighborhood configuration $\beta_{TS}$. The encoder and/or decoder may select the context based on an OBUF LUT that maps the neighborhood configuration $\beta_{TS}$ or the reduced configuration $\beta_{TS}'$ to an index of the context. The encoder and/or decoder may entropy code (e.g., arithmetic code) the vertex information of the current TriSoup edge E based on the context.

FIG. 18A, FIG. 18B, and FIG. 18C show a spatial topology comprising TriSoup edges and TriSoup nodes. The spatial topology may be a direction-independent spatial topology made of a combination of TriSoup edges and TriSoup nodes. FIG. 18A, FIG. 18B, FIG. 18C show an addition to the edge-only direction-independent spatial-topology of FIG. 17A, FIG. 17B, and FIG. 17C. The four TriSoup nodes, labeled A, B, C, D, intersecting the end point of the current TriSoup edge E have been added. These four nodes are not drawn to scale for sake of clarity of the figures. These four nodes may correspond to nodes 1020 to 1023 in FIG. 10B. The labeling of the four nodes has been made for each direction such as to obtain direction independence of the topology of the spatial topology made up of the five edges a, b, c, f, g and of the four nodes A to D. By doing so, one or more symbols of the neighborhood configuration $\beta_{TS}$ may be constructed from the direction-independent spatial topology made up of a combination of edges and nodes.

FIG. 19 shows an example method for coding vertex information of a current edge. More specifically, FIG. 19 shows a flowchart 1900 of example method steps for coding vertex information of a current edge. The example method, or one or more operations of the method, may be performed by one or more computing devices or entities. One or more steps of the example flowchart 1900 may be performed by a coder (e.g., an encoder, such as encoder 114 as shown in FIG. 1, or a decoder such as the decoder 120 as shown in FIG. 1). The method or one or more steps thereof may be embodied in computer-executable instructions that are stored in a computer-readable medium, such as a non-transitory computer readable medium. The steps in flowchart 1900 need not all be performed in the order specified and may be performed in any order. One or more steps in this example flowchart may be omitted.

At step 1902, the coder (e.g., encoder or decoder) may determine one or more symbols of a neighborhood configuration of a current edge. The coder (e.g., encoder or decoder) may determine one or more symbols of a neighborhood configuration of a current edge, for example, based on vertex information of at least one edge that does not intersect (e.g., fails to intersect) a start point of the current edge. An edge may be oriented from a start point to an end point following the orientation of one of the three axes of the 3D space in which it is parallel to.

The current edge may be an edge of a cuboid comprising part of a point cloud. The at least one edge that does not intersect (e.g., fails to intersect) a start point of the current edge may belong to a same cuboid as the current edge. The at least one edge that does not intersect (e.g., fails to intersect) a start point of the current edge may belong to a same cuboid as the current edge and may be parallel to the current edge. The at least one edge that does not intersect (e.g., fails to intersect) a start point of the current edge may belong to a same cuboid as the current edge and may intersect an end point of the current edge.

The coder may determine the one or more symbols of the neighborhood configuration. The coder may determine the one or more symbols of the neighborhood configuration, for example, based on one or more vertex presence flags of the at least one edge. The coder may determine the one or more symbols of the neighborhood configuration, for example, based on one or more vertex positions of the at least one edge.

The vertex information of the current edge may comprise a vertex presence flag of the current edge. The vertex information of the current edge may comprise a vertex position of the current edge.

At step 1904, the coder may select a context for coding vertex information of the current edge. The coder may select a context for coding vertex information of the current edge, for example, based on the neighborhood configuration.

The coder may select the context (e.g., probability model) for coding the vertex information of the current edge. The coder may select the context (e.g., probability model) for coding the vertex information of the current edge, for example, based on a lookup table (e.g., OBUF lookup table) that maps the neighborhood configuration to the context (e.g., probability model).

The coder may select the context (e.g., probability model) for coding the vertex information of the current edge. The coder may select the context (e.g., probability model) for coding the vertex information of the current edge, for example, based on a lookup table that maps only a subset of the symbols of the neighborhood configuration to the context (e.g., probability model). The subset of the symbols of the neighborhood configuration may be determined, for example, by using on an OBUF dynamic reduction function with respect to the symbols of the neighborhood configuration. A number (e.g., quantity) of symbols in the subset may be increased. A number (e.g., quantity) of symbols in the subset may be increased, for example based on a number (e.g., quantity) of coded edges with neighborhood information comprising the same subset of symbols. The coder (e.g., encoder or decoder) may update the lookup table to map the subset of symbols of the neighborhood configuration to a different context (e.g., probability model). The coder (e.g., encoder or decoder) may update the lookup table to map the subset of symbols of the neighborhood configuration to a different context (e.g., probability model), for example, based on the vertex information of the current edge.

At step 1906, the coder (e.g., encoder or decoder) may entropy code (e.g., arithmetic code) the vertex information of the current edge. The coder (e.g., encoder or decoder) may entropy code (e.g., arithmetic code) the vertex information of the current edge, for example, based on the context.

FIG. 20 shows an example method for coding vertex information of a current edge. More specifically, FIG. 20 shows a flowchart 2000 of example method steps of coding vertex information of a current edge. One or more steps of the example flowchart 200 may be performed by a coder (e.g., an encoder such as the encoder 114 as shown in FIG. 1, or a decoder such as the decoder 120 as shown in FIG. 1). The method or one or more steps thereof may be embodied in computer-executable instructions that are stored in a computer-readable medium, such as a non-transitory computer readable medium. The steps in flowchart 2000 need not all be performed in the order specified and may be performed in any order. One or more steps in this flowchart may be omitted.

At step 2002, the coder (e.g., encoder or decoder) may determine one or more symbols of a neighborhood configuration of a current edge. The coder (e.g., encoder or decoder) may determine one or more symbols of a neighborhood configuration of a current edge, for example, based on vertex information of edges only belonging to a spatial topology of edges. Each edge of the spatial topology of edges may be available for coding the current edge independent of a direction of the current edge.

The current edge may be an edge of a cuboid comprising part of a point cloud. The edges belonging to the spatial topology of edges may comprise at least one edge that does not intersect (e.g., fails to intersect) a start point of the current edge. An edge may be oriented from a start point to an end point following the orientation of one of the three axes of the 3D space in which it is parallel to. The at least one edge that does not intersect (e.g., fails to intersect) a start point of the current edge may belong to a same cuboid as the current edge. The at least one edge that does not intersect (e.g., fails to intersect) a start point of the current edge may belong to a same cuboid as the current edge and may be parallel to the current edge. The at least one edge that does not intersect (e.g., fails to intersect) a start point of the current edge may belong to a same cuboid as the current edge and may intersect an end point of the current edge.

One of a plurality of different configurations of the spatial topology of edges may be selected to determine the one or more symbols of the neighborhood information. One of a plurality of different configurations of the spatial topology of edges may be selected to determine the one or more symbols of the neighborhood information, for example, based on the direction of the current edge. The plurality of different configurations may comprise different rotated and/or mirrored configurations of the spatial topology of edges.

The coder (e.g., encoder or decoder) may determine the one or more symbols of the neighborhood configuration. The coder (e.g., encoder or decoder) may determine the one or more symbols of the neighborhood configuration, for example, based on one or more vertex presence flags of the edges only belonging to the spatial topology of edges. The coder may determine the one or more symbols of the neighborhood configuration based, for example, on one or more vertex positions of the edges only belonging to the spatial topology of edges.

The vertex information of the current edge may comprise a vertex presence flag of the current edge. The vertex information of the current edge may comprise a vertex position of the current edge.

At step 2004, the coder (e.g., encoder or decoder) may select a context for coding vertex information of the current edge. The coder (e.g., encoder or decoder) may select a context for coding vertex information of the current edge, for example. based on the neighborhood configuration. The coder may select the context (e.g., probability model) for coding the vertex information of the current edge, for example, based on a lookup table (e.g., OBUF lookup table) that maps the neighborhood configuration to the context (e.g., probability model).

The coder may select the context (e.g., probability model) for coding the vertex information of the current edge based, for example, on a lookup table that maps only a subset of the symbols of the neighborhood configuration to the context (e.g., probability model). The subset of the symbols of the neighborhood configuration may be determined, for example, by using an OBUF dynamic reduction function to the symbols of the neighborhood configuration. A number (e.g., quantity) of symbols in the subset may be increased, for example, based on a number (e.g., quantity) of coded edges with neighborhood information comprising the same subset of symbols. The coder (e.g., encoder or decoder) may update the lookup table to map the subset of symbols of the neighborhood configuration to a different context (e.g., probability model). The coder (e.g., encoder or decoder) may update the lookup table to map the subset of symbols of the neighborhood configuration to a different context (e.g., probability model), for example, based on the vertex information of the current edge.

At step 2006, the coder (e.g., encoder or decoder) may entropy code (e.g., arithmetic code) the vertex information of the current edge. the coder (e.g., encoder or decoder) may entropy code (e.g., arithmetic code) the vertex information of the current edge, for example, based on the context.

Figure 21:
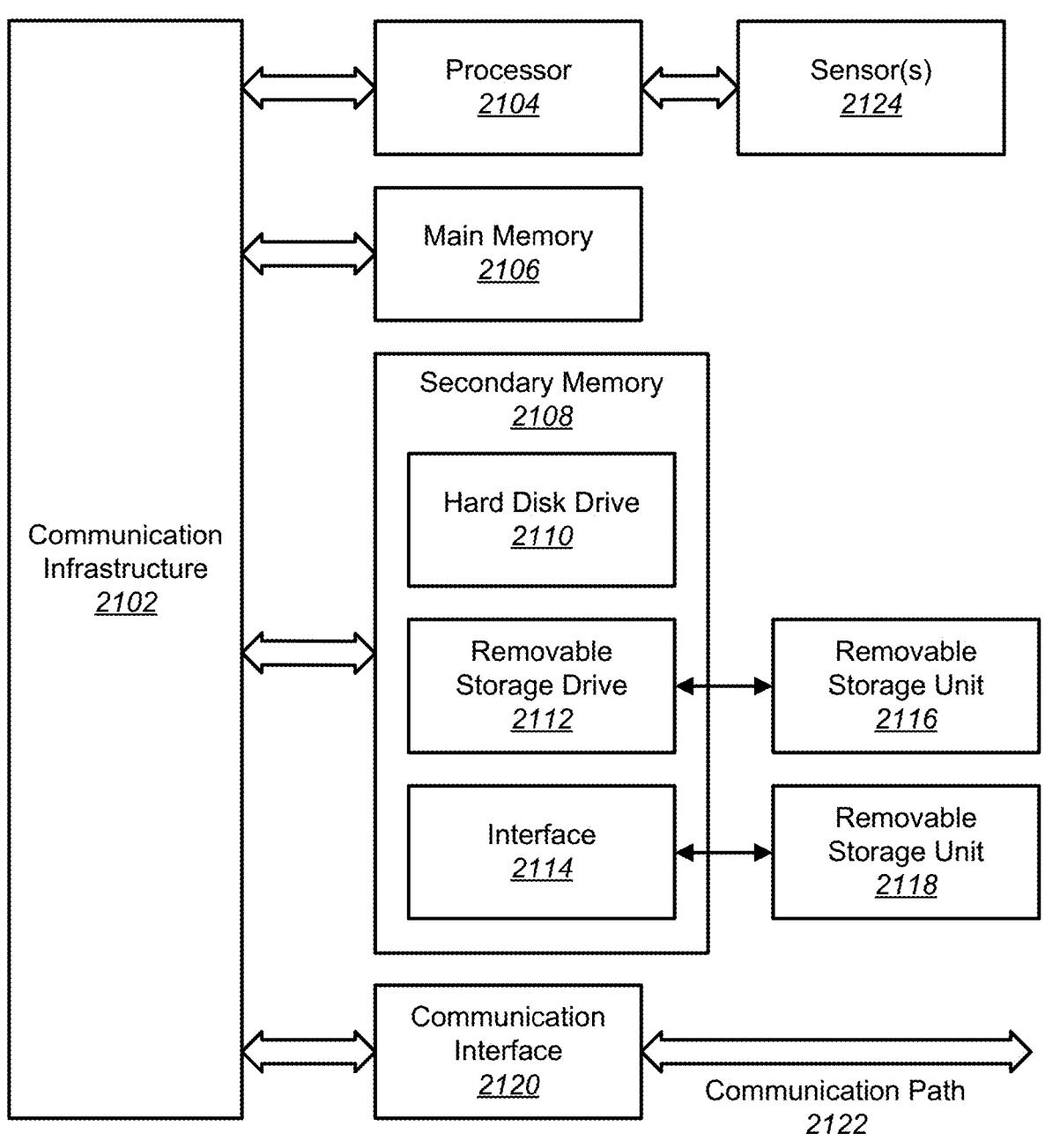
FIG. 21 shows an example computer system in which examples of the present disclosure may be implemented.

FIG. 21 shows an example computer system in which examples of the present disclosure may be implemented. For example, the example computer system 2100 shown in FIG. 21 may implement one or more of the methods described herein. For example, various devices and/or systems described herein (e.g., in FIGS. 1, 2, and 3) may be implemented in the form of one or more computer systems 2100. Furthermore, each of the steps of the flowcharts depicted in this disclosure may be implemented on one or more computer systems 2100.

Computer system 2100 may comprise one or more processors, such as a processor 2104. Processor 2104 may be a special purpose processor, a general purpose processor, a microprocessor, and/or a digital signal processor. Processor 2104 may be connected to a communication infrastructure 2102 (e.g., a bus or network). Computer system 2100 may also comprise a main memory 2106 (e.g., a random access memory (RAM)) and/or a secondary memory 2108.

Secondary memory 2108 may comprise a hard disk drive 2110 and/or a removable storage drive 2112 (e.g., a magnetic tape drive, an optical disc drive, and/or the like). Removable storage drive 2112 may read from and/or write to a removable storage unit 2116. Removable storage unit 2116 may comprise a magnetic tape, optical disc, and/or the like. Removable storage unit 2116 may be read by and/or may be written to removable storage drive 2112. Removable storage unit 2116 may comprise a computer usable storage medium having stored therein computer software and/or data.

Secondary memory 2108 may comprise other similar means for allowing computer programs or other instructions to be loaded into computer system 2100. Such means may include a removable storage unit 2118 and/or an interface 2114. Examples of such means may comprise a program cartridge and/or cartridge interface (such as in video game devices), a removable memory chip (e.g., an erasable programmable read-only memory (EPROM) or a programmable read-only memory (PROM)) and associated socket, a thumb drive and Universal Serial Bus (USB) port, and/or other removable storage units 2118 and interfaces 2114, which may allow software/or and data to be transferred from removable storage unit 2118 to computer system 2100.

Computer system 2100 may comprise a communications interface 2120. Communications interface 2120 may allow software and data to be transferred between computer system 2100 and external device(s). Examples of communications interface 2120 may include a modem, a network interface (e.g., an Ethernet card), a communications port, etc. Software and/or data transferred via communications interface 2120 may be in the form of signals which may be electronic, electromagnetic, optical, and/or other signals capable of being received by communications interface 2120. The signals may be provided to communications interface 2120 via a communications path 2122. Communications path 2122 may carry signals and may be implemented using wire or cable, fiber optics, a phone line, a cellular phone link, a radio frequency (RF) link, and/or other communications channels.

Computer system 2100 may include one or more sensor(s) 2124. Sensor(s) 2124 may measure and/or detect one or more physical quantities. Sensor(s) 2124 may convert the measured or detected physical quantities into an electrical signal in digital and/or analog form. For example, sensor(s) 2124 may include an eye tracking sensor to track the eye movement of a user. Based on the eye movement of a user, a display of a point cloud may be updated. In another example, sensor(s) 2124 may include a head tracking sensor (e.g., a gyroscope) to track the head movement of a user. Based on the head movement of a user, a display of a point cloud may be updated. In yet another example, sensor(s) 2124 may include a camera sensor for taking photographs and/or a 3D scanning device (e.g., a laser scanning, structured light scanning, and/or modulated light scanning device). 3D scanning devices may obtain geometry information by moving one or more laser heads, structured light, and/or modulated light cameras relative to the object or scene being scanned. The geometry information may be used to construct a point cloud.

A computer program medium and/or a computer-readable medium may be used to refer to tangible (e.g., non-transitory) storage media, such as removable storage units 2116 and 2118 or a hard disk installed in hard disk drive 2110. These computer program products may be means for providing software to computer system 2100. Computer programs (also referred to as computer control logic) may be stored in main memory 2106 and/or secondary memory 2108. The computer programs may be received via communications interface 2120. Such computer programs, when executed, may enable the computer system 2100 to implement one or more example embodiments of the present disclosure as discussed herein. In particular, the computer programs, when executed, may enable processor 2104 to implement the processes of the present disclosure, such as any of the methods described herein. Accordingly, such computer programs may represent controllers of computer system 2100.

Figure 22:
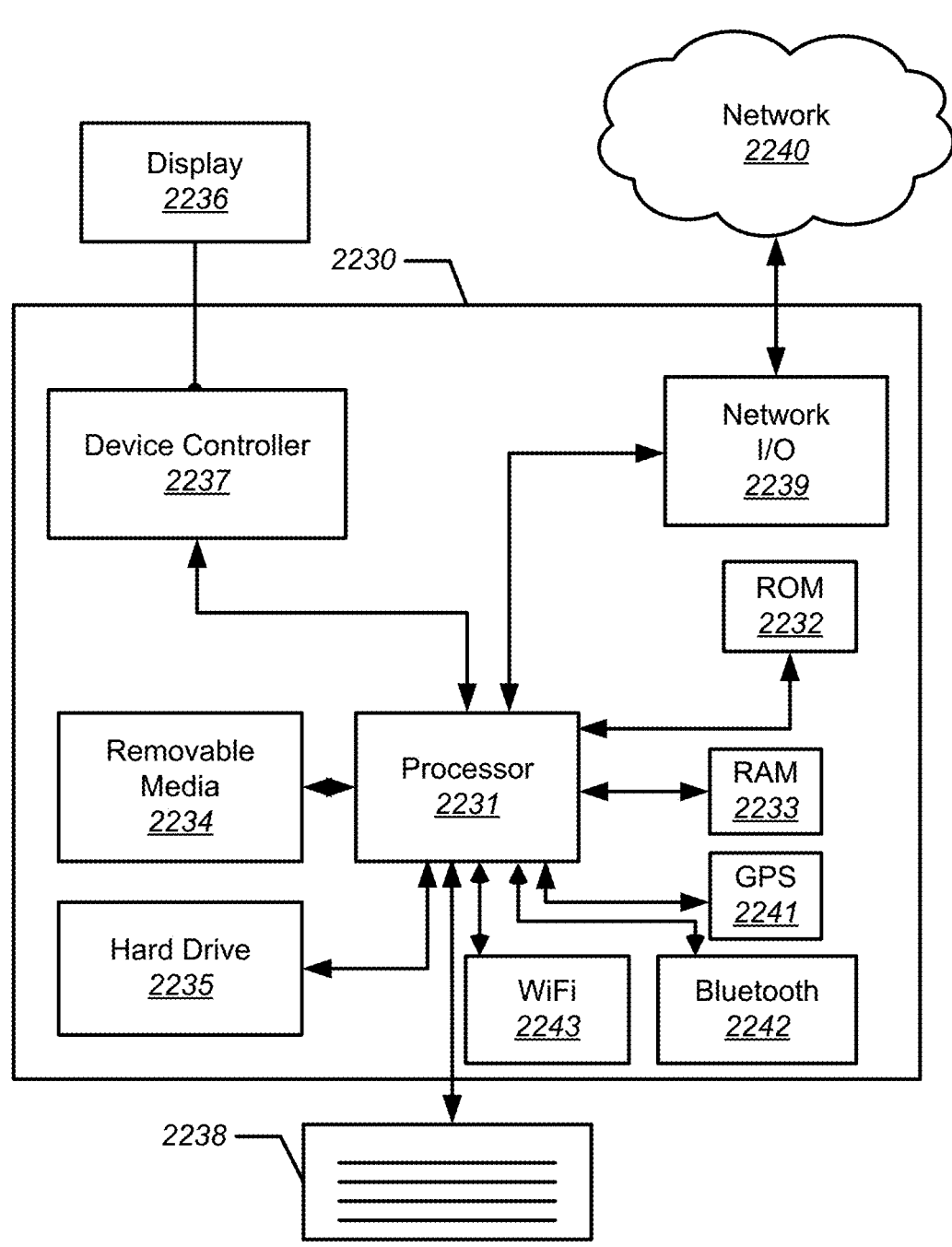
FIG. 22 shows example elements of a computing device that may be used to implement any of the various devices described herein.

FIG. 22 shows example elements of a computing device that may be used to implement any of the various devices described herein, including, for example, a source device (e.g., 102), an encoder (e.g., 114), a destination device (e.g., 106), a decoder (e.g., 120), and/or any computing device described herein. The computing device 2230 may include one or more processors 2231, which may execute instructions stored in the random-access memory (RAM) 2233, the removable media 2234 (e.g., a Universal Serial Bus (USB) drive, compact disc (CD) or digital versatile disc (DVD), or floppy disk drive), or any other desired storage medium. Instructions may also be stored in an attached (or internal) hard drive 2235. The computing device 2230 may also include a security processor (not shown), which may execute instructions of one or more computer programs to monitor the processes executing on the processor 2231 and any process that requests access to any hardware and/or software components of the computing device 2230 (e.g., ROM 2232, RAM 2233, the removable media 2234, the hard drive 2235, the device controller 2237, a network interface

2239, a GPS 2241, a Bluetooth interface 2242, a Wi-Fi interface 2243, etc.). The computing device 2230 may include one or more output devices, such as the display 2236 (e.g., a screen, a display device, a monitor, a television, etc.), and may include one or more output device controllers 2237, such as a video processor. There may also be one or more user input devices 2238, such as a remote control, keyboard, mouse, touch screen, microphone, etc. The computing device 2230 may also include one or more network interfaces, such as a network interface 2239, which may be a wired interface, a wireless interface, or a combination of the two. The network interface 2239 may provide an interface for the computing device 2230 to communicate with a network 2240 (e.g., a RAN, or any other network). The network interface 2239 may include a modem (e.g., a cable modem), and the external network 2240 may include communication links, an external network, an in-home network, a provider's wireless, coaxial, fiber, or hybrid fiber/coaxial distribution system (e.g., a DOCSIS network), or any other desired network. Additionally, the computing device 2230 may include a location-detecting device, such as a global positioning system (GPS) microprocessor 2241, which may be configured to receive and process global positioning signals and determine, with possible assistance from an external server and antenna, a geographic position of the computing device 2230.

The example in FIG. 22 may be a hardware configuration, although the components shown may be implemented as software as well. Modifications may be made to add, remove, combine, divide, etc. components of the computing device 2230 as desired. Additionally, the components may be implemented using basic computing devices and components, and the same components (e.g., processor 2231, ROM storage 2232, display 2236, etc.) may be used to implement any of the other computing devices and components described herein. For example, the various components described herein may be implemented using computing devices having components such as a processor executing computer-executable instructions stored on a computer-readable medium, as shown in FIG. 22. Some or all of the entities described herein may be software based, and may co-exist in a common physical platform (e.g., a requesting entity may be a separate software process and program from a dependent entity, both of which may be executed as software on a common computing device).

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. A method comprising determining, based on vertex information of a spatial topology of edges, one or more symbols of a neighborhood configuration of a current edge.

Clause 2. The method of clause 1, wherein each edge of the spatial topology of edges is available for coding the current edge independent of a direction of the current edge.

Clause 3. The method of any one of clauses 1-2, further comprising determining, based on the one or more symbols of the neighborhood configuration, a probability model.

Clause 4. The method of any one of clauses 1-3, further comprising entropy coding, based on the determined probability model, vertex information of the current edge.

Clause 5. The method of any one of clauses 1-4, wherein the determining the one or more symbols of the neighborhood configuration comprises: selecting, based on the direction of the current edge, one of a plurality of different configurations of the spatial topology of edges.

Clause 6. The method of clause 5, wherein the plurality of different configurations comprises a rotated configuration of the spatial topology of edges.

Clause 7. The method of any one of clauses 5-6, wherein the plurality of different configurations comprises a mirrored configuration of the spatial topology of edges.

Clause 8. The method of any one of clauses 1-7, wherein the determining the one or more symbols of the neighborhood configuration comprises determining the one or more symbols of the neighborhood configuration based on one or more vertex presence flags associated with the spatial topology of edges.

Clause 9. The method of any one of clauses 1-8, wherein the determining the one or more symbols of the neighborhood configuration comprises determining the one or more symbols of the neighborhood configuration based on one or more vertex positions associated with the spatial topology of edges.

Clause 10. The method of any one of clauses 1-9, wherein the vertex information of the current edge comprises a vertex presence flag associated with the current edge.

Clause 11. The method of any one of clauses 1-10, wherein the vertex information of the current edge comprises a vertex position associated with the current edge.

Clause 12. The method of any one of clauses 1-11, wherein the determining the probability model comprises determining the probability model based on a lookup table that maps, to the probability model, the neighborhood configuration.

Clause 13. The method of any one of clauses 1-12, wherein the determining the probability model comprises determining the probability model based on a lookup table that maps, to the probability model, a subset of the one or more symbols of the neighborhood configuration.

Clause 14. The method of any one of clauses 12-13, further comprising: increasing a quantity of symbols in the subset, based on a quantity of coded edges, with neighborhood information, comprising the symbols in the subset.

Clause 15. The method of any one of clauses 12-14, further comprising: updating, based on the vertex information of the current edge, the lookup table to map the subset to a different probability model.

Clause 16. The method of any one of clauses 1-15, wherein the spatial topology of edges comprises an edge that does not intersect a start point of the current edge.

Clause 17. The method of any one of clauses 1-16, wherein the spatial topology of edges comprises an edge belonging to a same cuboid as the current edge.

Clause 18. The method of any one of clauses 1-17, wherein the spatial topology of edges comprises an edge parallel to the current edge.

Clause 19. The method of any one of clauses 1-16, wherein the spatial topology of edges comprises an edge perpendicular to the current edge and intersecting an end point of the current edge.

Clause 20. The method of any one of clauses 1-19, wherein the neighborhood configuration further comprises: a second set of one or more symbols indicating the direction of the current edge.

Clause 21. The method of any one of clauses 1-20, wherein the neighborhood configuration further comprises: a third set of one or more symbols determined based on at least one edge that is not available for coding the current edge independent of the direction of the current edge.

Clause 22. The method of any one of clauses 1-21, wherein the current edge belongs to a cuboid comprising at least one point of a point cloud.

Clause 23. A computing device comprising one or more processors and memory storing instructions that, when executed by the one or more processors, cause the computing device to perform the method of any one of clauses 1-22.

Clause 24. A system comprising: a first computing device configured to perform the method of any one of clauses 1-22, and a second computing configured to decode the entropy coded vertex information of the current edge.

Clause 25. A computer-readable medium storing instructions that, when executed, cause performance of the method any one of clauses 1-22.

Clause 26. A method comprising, based on vertex information of at least one edge that fails to intersect a start point of a current edge, determining one or more symbols of a neighborhood configuration of the current edge.

Clause 27. The method of clause 26, further comprising determining, based on the one or more symbols of the neighborhood configuration, a probability model.

Clause 28. The method of any one of clauses 26-27, further comprising entropy coding, based on the determined probability model, vertex information of the current edge.

Clause 29. The method of any one of clauses 26-28, wherein the at least one edge comprises an edge belonging to a same cuboid as the current edge.

Clause 30. The method of any one of clauses 26-29, wherein the at least one edge comprises an edge parallel to the current edge.

Clause 31. The method of any one of clauses 26-30, wherein the at least one edge comprises an edge perpendicular to the current edge and intersecting an end point of the current edge.

Clause 32. The method of any one of clauses 26-31, wherein the vertex information of the current edge comprises: a first vertex presence flag associated with the current edge.

Clause 33. The method of any one of clauses 26-32, wherein the vertex information of the current edge comprises: a first vertex position associated with the current edge.

Clause 34. The method of any one of clauses 26-33, wherein the determining the one or more symbols of the neighborhood configuration comprises determining the one or more symbols of the neighborhood configuration based on a second vertex presence flag associated with the at least one edge.

Clause 35. The method of any one of clauses 26-34, wherein the determining the one or more symbols of the neighborhood configuration comprises determining the one or more symbols of the neighborhood configuration based on a second vertex position associated with the at least one edge.

Clause 36. The method of any one of clauses 26-35, wherein the determining the probability model comprises determining the probability model based on a lookup table that maps, to the probability model, the neighborhood configuration.

Clause 37. The method of any one of clauses 26-36, wherein the determining the probability model comprises determining the probability model based on a lookup table that maps, to the probability model, a subset of the one or more symbols of the neighborhood configuration.

Clause 38. The method of any one of clauses 36-37, further comprising: increasing a quantity of symbols in the subset, based on a quantity of coded edges, with neighborhood information, comprising the symbols in the subset.

Clause 39. The method of any one of clauses 36-38, further comprising: updating, based on the vertex information of the current edge, the lookup table to map the subset to a different probability model.

Clause 40. The method of any one of clauses 26-39, wherein the current edge belongs to a cuboid comprising at least one point of a point cloud.

Clause 41. A computing device comprising one or more processors and memory storing instructions that, when executed by the one or more processors, cause the computing device to perform the method of any one of clauses 26-40.

Clause 42. A system comprising: a first computing device configured to perform the method of any one of clauses 26-40, and a second computing configured to decode the entropy coded vertex information of the current edge.

Clause 43. A computer-readable medium storing instructions that, when executed, cause performance of the method any one of clauses 26-40.

Clause 44. A method comprising, based on vertex information of a subset of a spatial topology of edges, determining one or more symbols of a neighborhood configuration of a current edge.

Clause 45. The method of clause 44, further comprising determining, based on the one or more symbols of the neighborhood configuration, a probability model.

Clause 46. The method of any one of clauses 44-45, further comprising entropy coding, based on the determined probability model, vertex information of the current edge.

Clause 47. The method of any one of clauses 44-46, wherein the spatial topology of edges comprises a first edge parallel to the current edge.

Clause 48. The method of clause 47, wherein an end point of the first edge coincides with a start point of the current edge.

Clause 49. The method of any one of clauses 44-48, wherein the spatial topology of edges comprises a second edge perpendicular to the current edge.

Clause 50. The method of clause 49, wherein a start point of the second edge coincides with the start point of the current edge.

Clause 51. The method of any one of clauses 44-50, wherein the spatial topology of edges comprises a third edge perpendicular to the current edge.

Clause 52. The method of clause 51, wherein an end point of the third edge coincides with the start point of the current edge.

Clause 53. The method of any one of clauses 44-52, wherein the spatial topology of edges comprises a fourth edge parallel to the current edge and belonging to a first cuboid that comprises the current edge.

Clause 54. The method of any one of clauses 44-53, wherein the spatial topology of edges comprises a fifth edge perpendicular to the current edge and intersecting an end point of the current edge.

Clause 55. The method of any one of clauses 44-54, wherein the spatial topology of edges comprises a sixth edge belonging to a second cuboid that comprises the current edge.

Clause 56. The method of clause 55, wherein the sixth edge belongs to a first plane that is perpendicular to the current edge.

Clause 57. The method of any one of clauses 55-56, wherein the first plane comprises the start point of the current edge.

Clause 58. The method of any one of clauses 44-57, wherein the spatial topology of edges comprises a seventh edge belonging to a third cuboid that comprises the current edge.

Clause 59. The method of clause 58, wherein the seventh edge belongs to a second plane that is perpendicular to the current edge.

Clause 60. The method of any one of clauses 58-59, wherein the second plane comprises the end point of the current edge.

Clause 61. A computing device comprising one or more processors and memory storing instructions that, when executed by the one or more processors, cause the computing device to perform the method of any one of clauses 44-60.

Clause 62. A system comprising: a first computing device configured to perform the method of any one of clauses 44-60, and a second computing configured to decode the entropy coded vertex information of the current edge.

Clause 63. A computer-readable medium storing instructions that, when executed, cause performance of the method any one of clauses 44-60.

Clause 64. A method comprising determining one or more symbols of a neighborhood configuration of a current edge based on vertex information of edges only belonging to a spatial topology of edges.

Clause 65. The method of clause 64, wherein each edge of the spatial topology of edges is available for coding the current edge independent of a direction of the current edge.

Clause 66. The method of any one of clauses 64-65, further comprising selecting a context/probability model for coding vertex information of the current edge based on the neighborhood configuration.

Clause 67. The method of any one of clauses 64-66, further comprising entropy coding the vertex information of the current edge based on the context/probability model.

Clause 68. The method of any one of clauses 64-67, wherein one of a plurality of different configurations of the spatial topology of edges is selected to determine the one or more symbols of the neighborhood information based on the direction of the current edge.

Clause 69. The method of clause 68, wherein the plurality of different configurations comprises different rotated and/or mirrored configurations of the spatial topology of edges.

Clause 70. The method of any one of clauses 64-69, wherein the determining further comprises determining the one or more symbols of the neighborhood configuration based on one or more vertex presence flags of the edges only belonging to the spatial topology of edges.

Clause 71. The method of any one of clauses 64-70, wherein the determining further comprises determining the one or more symbols of the neighborhood configuration based on one or more vertex positions of the edges only belonging to the spatial topology of edges.

Clause 72. The method of any one of clauses 64-71, wherein the vertex information of the current edge comprises a vertex presence flag of the current edge.

Clause 73. The method of any one of clauses 64-72, wherein the vertex information of the current edge comprises a vertex position of the current edge.

Clause 74. The method of any one of clauses 64-73, wherein the selecting further comprises selecting the context/probability model for coding the vertex information of the current edge based on a look up table that maps the neighborhood configuration to the context/probability model.

Clause 75. The method of any one of clauses 64-74, wherein the selecting further comprises selecting the context/probability model for coding the vertex information of the current edge based on a look up table that maps only a subset of the symbols of the neighborhood configuration to the context/probability model.

Clause 76. The method of clause 75, wherein a number of symbols in the subset is increased based on a number of coded edges with neighborhood information comprising the same subset of symbols.

Clause 77. The method of any one of clauses 75-76, further comprising updating the look up table to map the subset of symbols of the neighborhood configuration to a different context/probability model based on the vertex information of the current edge.

Clause 78. The method of any one of clauses 64-77, wherein the edges only belonging to the spatial topology of edges comprise at least one edge that does not intersect a start point of the current edge.

Clause 79. The method of clause 78, wherein the at least one edge further belongs to a same cuboid as the current edge.

Clause 80. The method of clause 79, wherein the at least one edge is further parallel to the current edge.

Clause 81. The method of any one of clauses 79-80, wherein the at least one edge is further perpendicular to the current edge and intersects an end point of the current edge.

Clause 82. The method of any one of clauses 64-81, wherein the neighborhood configuration further comprises a second set of one or more symbols indicating the direction of the current edge.

Clause 83. The method of any one of clauses 64-82, wherein the neighborhood configuration further comprises a third set of one or more symbols determined based on at least one edge that is not available for coding the current edge independent of the direction of the current edge.

Clause 84. The method of any one of clauses 64-83, wherein the current edge is of a cuboid comprising part of a point cloud.

Clause 85. A computing device comprising one or more processors and memory storing instructions that, when executed by the one or more processors, cause the computing device to perform the method of any one of clauses 64-84.

Clause 86. A system comprising: a first computing device configured to perform the method of any one of clauses 64-84, and a second computing configured to decode the entropy coded vertex information of the current edge.

Clause 87. A computer-readable medium storing instructions that, when executed, cause performance of the method any one of clauses 64-84.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated if its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. If implemented in software, firmware, middleware or microcode, the program code or code segments to perform the necessary tasks (e.g., a computer-program product) may be stored in a computer-readable or machine-readable medium. A processor(s) may perform the necessary tasks. Features of the present disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disc, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   determining, by a computing device and based on vertex information of a spatial topology of edges, one or more symbols of a neighborhood configuration of a current edge, wherein each edge of the spatial topology of edges is available for coding the current edge independent of a direction of the current edge;
   determining, based on the one or more symbols of the neighborhood configuration, a probability model; and
   entropy coding, based on the determined probability model, vertex information of the current edge.

2. The method of claim 1, wherein the determining the one or more symbols of the neighborhood configuration comprises:
   selecting, based on the direction of the current edge, one of a plurality of different configurations of the spatial topology of edges.

3. The method of claim 2, wherein the plurality of different configurations comprises at least one of:
   a rotated configuration of the spatial topology of edges, or
   a mirrored configuration of the spatial topology of edges.

4. The method of claim 1, wherein the determining the one or more symbols of the neighborhood configuration comprises determining the one or more symbols of the neighborhood configuration based on at least one of:
   one or more vertex presence flags associated with the spatial topology of edges, or
   one or more vertex positions associated with the spatial topology of edges.

5. The method of claim 1, wherein the vertex information of the current edge comprises at least one of:
   a vertex presence flag associated with the current edge, or
   a vertex position associated with the current edge.

6. The method of claim 1, wherein the determining the probability model comprises determining the probability model based on a lookup table that maps, to the probability model, at least one of:

the neighborhood configuration, or a subset of the one or more symbols of the neighborhood configuration.

7. The method of claim 6, further comprising:

increasing a quantity of symbols in the subset, based on a quantity of coded edges, with neighborhood information, comprising the symbols in the subset.

8. The method of claim 6, further comprising:

updating, based on the vertex information of the current edge, the lookup table to map the subset to a different probability model.

9. The method of claim 1, wherein the spatial topology of edges comprises at least one of:

an edge that does not intersect a start point of the current edge, an edge belonging to a same cuboid as the current edge, an edge parallel to the current edge, or an edge perpendicular to the current edge and intersecting an end point of the current edge.

10. The method of claim 1, wherein the neighborhood configuration further comprises:

a second set of one or more symbols indicating the direction of the current edge; and a third set of one or more symbols determined based on at least one edge that is not available for coding the current edge independent of the direction of the current edge.

11. The method of claim 1, wherein the current edge belongs to a cuboid comprising at least one point of a point cloud.

12. A method comprising:

based on vertex information of at least one edge that fails to intersect a start point of a current edge, determining, by a computing device, one or more symbols of a neighborhood configuration of the current edge;

determining, based on the one or more symbols of the neighborhood configuration, a probability model; and entropy coding, based on the determined probability model, vertex information of the current edge.

13. The method of claim 12, wherein the at least one edge comprises at least one of:

an edge belonging to a same cuboid as the current edge, an edge parallel to the current edge, or an edge perpendicular to the current edge and intersecting an end point of the current edge.

14. The method of claim 12, wherein the vertex information of the current edge comprises at least one of:

a first vertex presence flag associated with the current edge, or a first vertex position associated with the current edge, and wherein the determining the one or more symbols of the neighborhood configuration comprises determining the one or more symbols of the neighborhood configuration based on at least one of:

a second vertex presence flag associated with the at least one edge, or a second vertex position associated with the at least one edge.

15. The method of claim 12, wherein the determining the probability model comprises determining the probability model based on a lookup table that maps, to the probability model, at least one of:

the neighborhood configuration, or a subset of the one or more symbols of the neighborhood configuration.

16. The method of claim 15, further comprising:

increasing a quantity of symbols in the subset, based on a quantity of coded edges, with neighborhood information, comprising the symbols in the subset.

17. The method of claim 15, further comprising:

updating, based on the vertex information of the current edge, the lookup table to map the subset to a different probability model.

18. The method of claim 12, wherein the current edge belongs to a cuboid comprising at least one point of a point cloud.

19. A method comprising:

determining, by a computing device and based on a first spatial topology of edges, a first set of one or more symbols of a neighborhood configuration of a current edge, wherein the first set of one or more symbols are independent of a direction of the current edge;

determining, based on the direction of the current edge, a second set of one or more symbols of the neighborhood configuration of the current edge;

determining, based on a second spatial topology of edges different from the first spatial topology of edges, a third set of one or more symbols of the neighborhood configuration of the current edge; and entropy coding, based on the first set of one or more symbols, the second set of one or more symbols, and the third set of one or more symbols, vertex information of the current edge.

20. The method of claim 19, wherein the first spatial topology of edges comprises at least one of:

a first edge parallel to the current edge, wherein an end point of the first edge coincides with a start point of the current edge, a second edge perpendicular to the current edge, wherein a start point of the second edge coincides with the start point of the current edge, a third edge perpendicular to the current edge, wherein an end point of the third edge coincides with the start point of the current edge, a fourth edge parallel to the current edge and belonging to a first cuboid that comprises the current edge, a fifth edge perpendicular to the current edge and intersecting an end point of the current edge, a sixth edge belonging to a second cuboid that comprises the current edge, wherein the sixth edge belongs to a first plane that is perpendicular to the current edge, and wherein the first plane comprises the start point of the current edge, or a seventh edge belonging to a third cuboid that comprises the current edge, wherein the seventh edge belongs to a second plane that is perpendicular to the current edge, and wherein the second plane comprises the end point of the current edge.

21. A computing device comprising:

one or more processors; and memory storing instructions that, when executed by the one or more processors, configure the computing device to:

determine, based on vertex information of a spatial topology of edges, one or more symbols of a neighborhood configuration of a current edge, wherein each edge of the spatial topology of edges is available for coding the current edge independent of a direction of the current edge;

determine, based on the one or more symbols of the neighborhood configuration, a probability model; and entropy code, based on the determined probability model, vertex information of the current edge.

22. The computing device of claim 21, wherein the instructions, when executed by the one or more processors, configure the computing device to determine the one or more symbols of the neighborhood configuration by:

selecting, based on the direction of the current edge, one of a plurality of different configurations of the spatial topology of edges.

23. The computing device of claim 22, wherein the plurality of different configurations comprises at least one of:

a rotated configuration of the spatial topology of edges, or a mirrored configuration of the spatial topology of edges.

24. The computing device of claim 21, wherein the instructions, when executed by the one or more processors, configure the computing device to determine the one or more symbols of the neighborhood configuration by:

determining the one or more symbols of the neighborhood configuration based on at least one of:

one or more vertex presence flags associated with the spatial topology of edges, or one or more vertex positions associated with the spatial topology of edges.

25. The computing device of claim 21, wherein the vertex information of the current edge comprises at least one of:

a vertex presence flag associated with the current edge, or a vertex position associated with the current edge.

26. The computing device of claim 21, wherein the instructions, when executed by the one or more processors, configure the computing device to determine the probability model by:

determining the probability model based on a lookup table that maps, to the probability model, at least one of:

the neighborhood configuration, or a subset of the one or more symbols of the neighborhood configuration.

27. The computing device of claim 26, wherein the instructions, when executed by the one or more processors, further configure the computing device to:

increase a quantity of symbols in the subset, based on a quantity of coded edges, with neighborhood information, comprising the symbols in the subset.

28. The computing device of claim 26, wherein the instructions, when executed by the one or more processors, further configure the computing device to:

update, based on the vertex information of the current edge, the lookup table to map the subset to a different probability model.

29. The computing device of claim 21, wherein the spatial topology of edges comprises at least one of:

an edge that does not intersect a start point of the current edge, an edge belonging to a same cuboid as the current edge, an edge parallel to the current edge, or an edge perpendicular to the current edge and intersecting an end point of the current edge.

30. The computing device of claim 21, wherein the neighborhood configuration further comprises:

a second set of one or more symbols indicating the direction of the current edge; and a third set of one or more symbols determined based on at least one edge that is not available for coding the current edge independent of the direction of the current edge.

31. The computing device of claim 21, wherein the current edge belongs to a cuboid comprising at least one point of a point cloud.

32. One or more non-transitory computer-readable media storing instructions that, when executed, cause:

determining, based on vertex information of a spatial topology of edges, one or more symbols of a neighborhood configuration of a current edge, wherein each edge of the spatial topology of edges is available for coding the current edge independent of a direction of the current edge;

determining, based on the one or more symbols of the neighborhood configuration, a probability model; and entropy coding, based on the determined probability model, vertex information of the current edge.

33. The one or more non-transitory computer-readable media of claim 32, wherein the instructions, when executed, cause the determining the one or more symbols of the neighborhood configuration by:

selecting, based on the direction of the current edge, one of a plurality of different configurations of the spatial topology of edges.

34. The one or more non-transitory computer-readable media of claim 33, wherein the plurality of different configurations comprises at least one of:

a rotated configuration of the spatial topology of edges, or a mirrored configuration of the spatial topology of edges.

35. The one or more non-transitory computer-readable media of claim 32, wherein the instructions, when executed, cause the determining the one or more symbols of the neighborhood configuration by:

determining the one or more symbols of the neighborhood configuration based on at least one of:

one or more vertex presence flags associated with the spatial topology of edges, or one or more vertex positions associated with the spatial topology of edges.

36. The one or more non-transitory computer-readable media of claim 32, wherein the vertex information of the current edge comprises at least one of:

a vertex presence flag associated with the current edge, or a vertex position associated with the current edge.

37. The one or more non-transitory computer-readable media of claim 32, wherein the instructions, when executed, cause the determining the probability model by:

determining the probability model based on a lookup table that maps, to the probability model, at least one of:

the neighborhood configuration, or a subset of the one or more symbols of the neighborhood configuration.

38. The one or more non-transitory computer-readable media of claim 37, wherein the instructions, when executed, further cause:

increasing a quantity of symbols in the subset, based on a quantity of coded edges, with neighborhood information, comprising the symbols in the subset.

39. The one or more non-transitory computer-readable media of claim 37, wherein the instructions, when executed, further cause:

updating, based on the vertex information of the current edge, the lookup table to map the subset to a different probability model.

40. The one or more non-transitory computer-readable media of claim 32, wherein the spatial topology of edges comprises at least one of:

an edge that does not intersect a start point of the current edge, an edge belonging to a same cuboid as the current edge, an edge parallel to the current edge, or an edge perpendicular to the current edge and intersecting an end point of the current edge.

41. The one or more non-transitory computer-readable media of claim 32, wherein the neighborhood configuration further comprises:

a second set of one or more symbols indicating the direction of the current edge; and a third set of one or more symbols determined based on at least one edge that is not available for coding the current edge independent of the direction of the current edge.

42. The one or more non-transitory computer-readable media of claim 32, wherein the current edge belongs to a cuboid comprising at least one point of a point cloud.

\* \* \* \* \*